US010009261B2

(12) United States Patent
Zhang et al.

(10) Patent No.: US 10,009,261 B2
(45) Date of Patent: Jun. 26, 2018

(54) METHOD AND SYSTEM OF CHECKPOINT AND ROLLBACK RECOVERY FOR FORWARDING STATES OF A SOFTWARE-DEFINED NETWORKING (SDN) SYSTEM

(71) Applicant: Telefonaktiebolaget L M Ericsson (publ), Stockholm (SE)

(72) Inventors: Ying Zhang, Fremont, CA (US); Neda Beheshti-Zavareh, San Jose, CA (US); Ravi Manghirmalani, Fremont, CA (US)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 374 days.

(21) Appl. No.: 14/525,107

(22) Filed: Oct. 27, 2014

(65) Prior Publication Data

US 2016/0057052 A1    Feb. 25, 2016

Related U.S. Application Data

(60) Provisional application No. 62/040,316, filed on Aug. 21, 2014.

(51) Int. Cl.
*G06F 15/173* (2006.01)
*H04L 12/703* (2013.01)
(Continued)

(52) U.S. Cl.
CPC .......... *H04L 45/28* (2013.01); *H04L 41/0863* (2013.01); *H04L 45/745* (2013.01); *H04L 47/33* (2013.01)

(58) Field of Classification Search
CPC ... H04L 45/28; H04L 45/745; H04L 41/0863; H04L 47/33
See application file for complete search history.

(56) References Cited

U.S. PATENT DOCUMENTS 5,630,047 A * 5/1997 Wang .................. G06F 11/1479
714/15
2003/0005102 A1 1/2003 Russell
(Continued)

OTHER PUBLICATIONS

J. Postel, "User Datagram Protocol," Aug. 28, 1980, 3 pages, RFC: 768.

(Continued)

*Primary Examiner* — Michael A Keller
(74) *Attorney, Agent, or Firm* — Patent Portfolio Builders, PLLC

(57) ABSTRACT

Methods implemented in an electronic device are disclosed for checkpoint and rollback recovery in a SDN system. The method utilizes message identifiers to indicate an order of consistent states of forwarding tables of a plurality of network elements of the SDN system. The SDN controller of the SDN system receives a request to recover the network to a previous state, and identifies a consistent state of forwarding table for each of the plurality of network elements utilizing the message identifiers associated the consistent states, where the identified consistent states represent the previous state of the network without the identified consistent states being captured at the same time at the plurality of network elements. The SDN controller indicates the identified consistent state for each of the plurality of the network elements to a corresponding network element, where the corresponding network element makes its forwarding table consistent with the identified consistent state.

17 Claims, 9 Drawing Sheets

(51) Int. Cl.
H04L 12/741 (2013.01)
H04L 12/801 (2013.01)
H04L 12/24 (2006.01)

(56) References Cited

U.S. PATENT DOCUMENTS

| | | | | |
|---|---|---|---|---|
| 2003/0037136 A1* | 2/2003 | Labovitz | ............. | H04L 12/2602 709/224 |
| 2005/0108576 A1* | 5/2005 | Munshi | ................. | H04L 9/0891 726/4 |
| 2006/0193333 A1* | 8/2006 | Baughan | ................. | H04L 45/02 370/400 |
| 2001/0220356 | 9/2007 | Ruscio et al. | | |
| 2013/0266007 A1* | 10/2013 | Kumbhare | .............. | H04L 45/56 370/389 |
| 2014/0064279 A1* | 3/2014 | Carlson | ................. | H04L 45/021 370/392 |

OTHER PUBLICATIONS

"Transmission Control Protocol, DARPA Internet Program Protocol Specification," Sep. 1981, 91 pages, RFC: 793, Information Sciences Institute, University of Southern California, Marina del Rey, California.
T. Socolofsky, et al., "A TCP/IP Tutorial," Jan. 1991, 28 pages, Network Working Group, Request for Comments: 1180.
S. Deering, et al., "Internet Protocol, Version 6 (IPv6) Specification," Dec. 1998, 39 pages, Network Working Group, Request for Comments: 2460, The Internet Society.
K. Nichols, et al., "Definition of the Differentiated Services Field (DS Field) in the IPv4 and IPv6 Headers," Dec. 1998, 20 pages, Network Working Group, Request for Comments: 2474, The Internet Society.
S. Blake, et al., "An Architecture for Differentiated Services," Dec. 1998, 36 pages, Network Working Group, Request for Comments: 2475, The Internet Society.
J. Heinanen, et al., "Assured Forwarding PHB Group," Jun. 1999, 11 pages, Network Working Group, Request for Comments: 2597, The Internet Society.
D. Borman, et al., "IPv6 Jumbograms," Aug. 1999, 9 pages, Network Working Group, Request for Comments: 2675, The Internet Society.
D. Black, "Differentiated Services and Tunnels," Oct. 2000, 14 pages, Network Working Group, Request for Comments: 2983, The Internet Society.
K. Nichols, et al., "Definition of Differentiated Services Per Domain Behaviors and Rules for their Specification," Apr. 2001, 24 pages, Network Working Group, Request for Comments: 3086, The Internet Society.
D. Black, et al., "Per Hop Behavior Identification Codes," Jun. 2001, 8 pages, Network Working Group, Request for Comments: 3140, The Internet Society.
B. Davie, et al., "An Expedited Forwarding PHB (Per-Hop Behavior)," Mar. 2002, 16 pages, Network Working Group, Request for Comments: 3246, The Internet Society.
A. Charny, et al., "Supplemental Information for the New Definition of the EF PHB (Expedited Forwarding Per-Hop Behavior)," Mar. 2002, 24 pages, Network Working Group, Request for Comments: 3247, The Internet Society.

D. Grossman, "New Terminology and Clarifications for Diffserv," Apr. 2002, 10 pages, Network Working Group, Request for Comments: 3260, The Internet Society.
F. Baker, et al., "Management Information Base for the Differentiated Services Architecture," May 2002, 116 pages, Network Working Group, Request for Comments: 3289, The Internet Society.
Y. Bernet, et al., "An Informal Management Model for Diffserv Routers," May 2002, 56 pages, Network Working Group, Request for Comments: 3290, The Internet Society.
K. Chan, et al., "Differentiated Services Quality of Service Policy Information Base," Mar. 2003, 96 pages, Network Working Group, Request for Comments: 3317, The Internet Society.
B. Fenner, et al., "Management Information Base for the User Datagram Protocol (UDP)," Jun. 2005, 19 pages, Network Working Group, Request for Comments: 4113, The Internet Society.
S. Kent, et al., "Security Architecture for the Internet Protocol," Dec. 2005, 101 pages, Network Working Group, Request for Comments: 4301, The Internet Society.
R. Housley, et al., "Using Advanced Encryption Standard (AES) CCM Mode with IPsec Encapsulating Security Payload (ESP)," Dec. 2005, 13 pages, Network Working Group, Request for Comments: 4309, The Internet Society.
E. Rosen, et al., "BGP/MPLS IP Virtual Private Networks (VPNs)," Feb. 2006, 47 pages, Network Working Group, Request for Comments: 4364, The Internet Society.
J. Babiarz, et al., "Configuration Guidelines for DiffServ Service Classes," Aug. 2006, 57 pages, Network Working Group, Request for Comments: 4594, The Internet Society.
K. Kompella, et al., "Virtual Private LAN Service (VPLS) Using BGP for Auto-Discovery and Signaling," Jan. 2007, 28 pages, Network Working Group, Request for Comments: 4761, The IETF Trust.
M. Lasserre, et al., "Virtual Private LAN Service (VPLS) Using Label Distribution Protocol (LDP) Signaling," Jan. 2007, 31 pages, Network Working Group, Request for Comments: 4762, The IETF Trust.
L. Eggert, et al., "Unicast UDP Usage Guidelines for Application Designers," Nov. 2008, 27 pages, Network Working Group, Request for Comments: 5405, IETF Trust and the persons identified as the document authors.
F. Baker, et al., "A Differentiated Services Code Point (DSCP) for Capacity-Admitted Traffic," May 2010, 14 pages, Internet Engineering Task Force (IETF).
Request for Comments: 5865, IETF Trust and the persons identified as the document authors.
"OpenFlow v1.1", Open Networking Foundation, <http://www.openflow.org/wk/index.php/OpenFlow_v1.1>, 2011, 7 pages.
McKeown, et al., "OpenFlow: Enabling Innovation in Campus Networks," SIGCOMM, Mar. 14, 2008, 6 pages.
Plank, et al., "Libckpt: Transparent Checkpointing under Unix," Usinex Winter Technical Conference, Jan. 16-20, 1995, 13 pages.
Plank, et al., "Memory Exclusion: Optimizing the Performance of Checkpointing Systems", Tech. Rep. UT-CS-96335, University of Tennessee, Aug. 1996, 15 pages.
Zhang, et al., "Checkpoint and Rollback Recovery for SDN Forwarding States," Ericsson Research, Aug. 22, 2014, 7 pages.
Kangarlou, Ardalan et al. "In-Network Live Snapshot Service for Recovering Virtual Infrastructures," vol. 25, No. 4, XP011336145, Jul. 1, 2011, pp. 12-19.

* cited by examiner

Initial Maximum Recoverable Consistent Checkpoints (MRCs) 432: {A, D, F, G}
MRC Update Resulted from Edge D → B 434: {B, D, F, G}
MRC Update Resulted from Edge F → E 436: {B, E, F, G}

C: The set of checkpoints;
M: The initial Maximum Recoverable Checkpoints (MRCs);
CPG: Checkpoint Graph;
T: The set of network update;
Switch: A network element of a SDN system;

Algorithm 1 Rollback algorithm procedure *FindMRC(C,M,T)*

Construct nodes of CPG from C;
    for each update $t \in T$ do ⬅ 504
        for each switch pair $m$ and $n$ affected by $t$ do ⎫
            if $\exists c_i^m, c_j^n \in C, c_i^m < t, c_j^n > t$ then ⎬ 506
                Find $c_{j-1}^n$, where $c_{j-1}^n < t$.
                Add edge $c_i^m$ to $c_{j-1}^n$ ⎭
    for every element $c \in MRC$ do ⎫
        for every $c'$ if $\exists$ edge $c \rightarrow c'$ do ⎬ 508
            $MRC \cup = \{c'\}$ ⎭
    MRC={earliest checkpoint of each process in MRC} 510

FIG. 5

METHOD AND SYSTEM OF CHECKPOINT AND ROLLBACK RECOVERY FOR FORWARDING STATES OF A SOFTWARE-DEFINED NETWORKING (SDN) SYSTEM

CROSS-REFERENCE TO RELATED APPLICATIONS

This application claims the benefit of U.S. Provisional Application No. 62/040,316, filed Aug. 21, 2014, which is hereby incorporated by reference.

FIELD OF INVENTION

The embodiments of the invention are related to the field of networking. More specifically, the embodiments of the invention relate to a method and system of checkpoint and rollback recovery for forwarding states of a software-defined networking (SDN) system.

BACKGROUND

The susceptibility to failures is a key factor for the prosperity of any network technologies. Despite all the efforts that have been put into adding reliability and high availability to networking systems, errors such as software bugs, hardware failures, and configuration errors are inevitable, and could severely impact the performance of a network. Therefore, parallel to developing new debugging tools, it is necessary to improve the support for recovery from errors.

Checkpoint and rollback recovery is a powerful approach for eliminating transient errors in servers and distributed systems. In this approach, a system periodically records its state during normal operation (checkpointing) and stores the state in some non-volatile storage (the state may be referred to as a checkpoint). Upon failure, a previous correct state is restored, and execution restarts from this intermediate state (referred to as a rollback process), thereby reducing the amount of lost computation. This avoids restarting from the beginning for long-running applications which can be costly.

SDN as a network architecture has gain significant interests in networking industry. A SDN system offers programmability, centralized intelligence, and abstractions from the underlying network infrastructure. It will be advantageous to be efficiently recover from errors in a SDN system.

SUMMARY

A method of checkpoint and rollback recovery for forwarding states of a network is disclosed. The method is implemented in an electronic device serving as a software-defined networking (SDN) controller in the network containing a plurality of network elements, each network element containing a forwarding table for forwarding traffic. The method starts with sending messages to the plurality of network elements from the electronic device, where each message contains a message identifier, where the message identifier indicates an order of the messages, where the network elements utilize at least some of the messages to update forwarding tables of the network elements, where the network elements capture consistent states of forwarding tables of the network elements, and where each consistent state is associated with one message identifier. The method continues with SDN controller receiving a set of values from each of the plurality of network elements, where each of the set of values is associated with one consistent state for one network element. The method continues with the SDN controller receiving a request to recover the network to a previous state, and identifying a consistent state of forwarding table for each of the plurality of the network elements utilizing the message identifiers associated the consistent states, where the identified consistent states represent the previous state of the network without the identified consistent states being captured at the same time at the plurality of network elements. The method continues with the SDN controller indicating the identified consistent state for each of the plurality of the network elements to a corresponding network element, where the corresponding network element updates its forwarding table to match the identified consistent state if its forwarding table is inconsistent with the identified consistent state.

An electronic device serving as a software-defined networking (SDN) controller coupled to a network containing network elements is disclosed. Each network element contains a forwarding table for forwarding traffic. The electronic device comprises a processor and a non-transitory machine-readable storage medium coupled to the processor. The non-transitory machine-readable storage medium contains a consistent state finder executable by the processor, wherein the electronic device is operative to perform the following. The electronic device sends messages to the plurality of network elements from the electronic device, where each message contains a message identifier, where the message identifier indicates an order of the messages, where the network elements utilize at least some of the messages to update forwarding tables of the network elements, where the network elements capture consistent states of forwarding tables of the network elements, and where each consistent state is associated with one message identifier. The electronic device receives a request to recover the network to a previous state, and identifies a consistent state of forwarding table for each of the plurality of the network elements utilizing the message identifiers associated the consistent states, where the identified consistent states represent the previous state of the network without the identified consistent states being captured at the same time at the plurality of network elements. The electronic device indicates the identified consistent state for each of the plurality of the network elements to a corresponding network element, where the corresponding network element updates its forwarding table to match the identified consistent state if its forwarding table is inconsistent with the identified consistent state.

A non-transitory machine-readable medium for checkpoint and rollback recovery for forwarding states of a network is disclosed. The non-transitory machine-readable medium has instructions stored therein, which when executed by a processor, cause the processor to perform operations at an electronic device serving as a software-defined networking (SDN) controller coupled to the network containing a plurality of network elements. Each network element contains a forwarding table for forwarding traffic. The operations include sending messages to the plurality of network elements from the electronic device, where each message contains a message identifier, where the message identifier indicates an order of the messages, where the network elements utilize at least some of the messages to update forwarding tables of the network elements, where the network elements capture consistent states of forwarding tables of the network elements, and where each consistent state is associated with one message identifier. The operations continue with SDN controller receiving a set of values from each of the plurality of network elements, where each of the set of values is associated with one consistent state for one network element. The operations continue with the SDN controller receiving a request to recover the network to a previous state, and identifying a consistent state of forwarding table for each of the plurality of the network elements utilizing the message identifiers associated the consistent states, where the identified consistent states represent the previous state of the network without the identified consistent states being captured at the same time at the plurality of network elements. The operations continue with the SDN controller indicating the identified consistent state for each of the plurality of the network elements to a corresponding network element, where the corresponding network element updates its forwarding table to match the identified consistent state if its forwarding table is inconsistent with the identified consistent state Embodiments of the invention provide ways for a SDN system to set up checkpoint of consistent states for the network elements so that the SDN system may roll back to a previous state that is correct and consistent among all the network elements.

BRIEF DESCRIPTION OF THE DRAWINGS

The present invention is illustrated by way of example, and not by way of limitation, in the figures of the accompanying drawings in which like references indicate similar elements. It should be noted that different references to "an" or "one" embodiment in this specification are not necessarily to the same embodiment, and such references mean at least one. Further, when a particular feature, structure, or characteristic is described in connection with an embodiment, it is submitted that it is within the knowledge of one skilled in the art to affect such feature, structure, or characteristic in connection with other embodiments whether or not explicitly described.

FIG. 5 is a pseudo code program illustrating an algorithm for identifying the maximum recoverable checkpoints of a SDN system according one embodiment of the invention.

DETAILED DESCRIPTION

Figure 1:
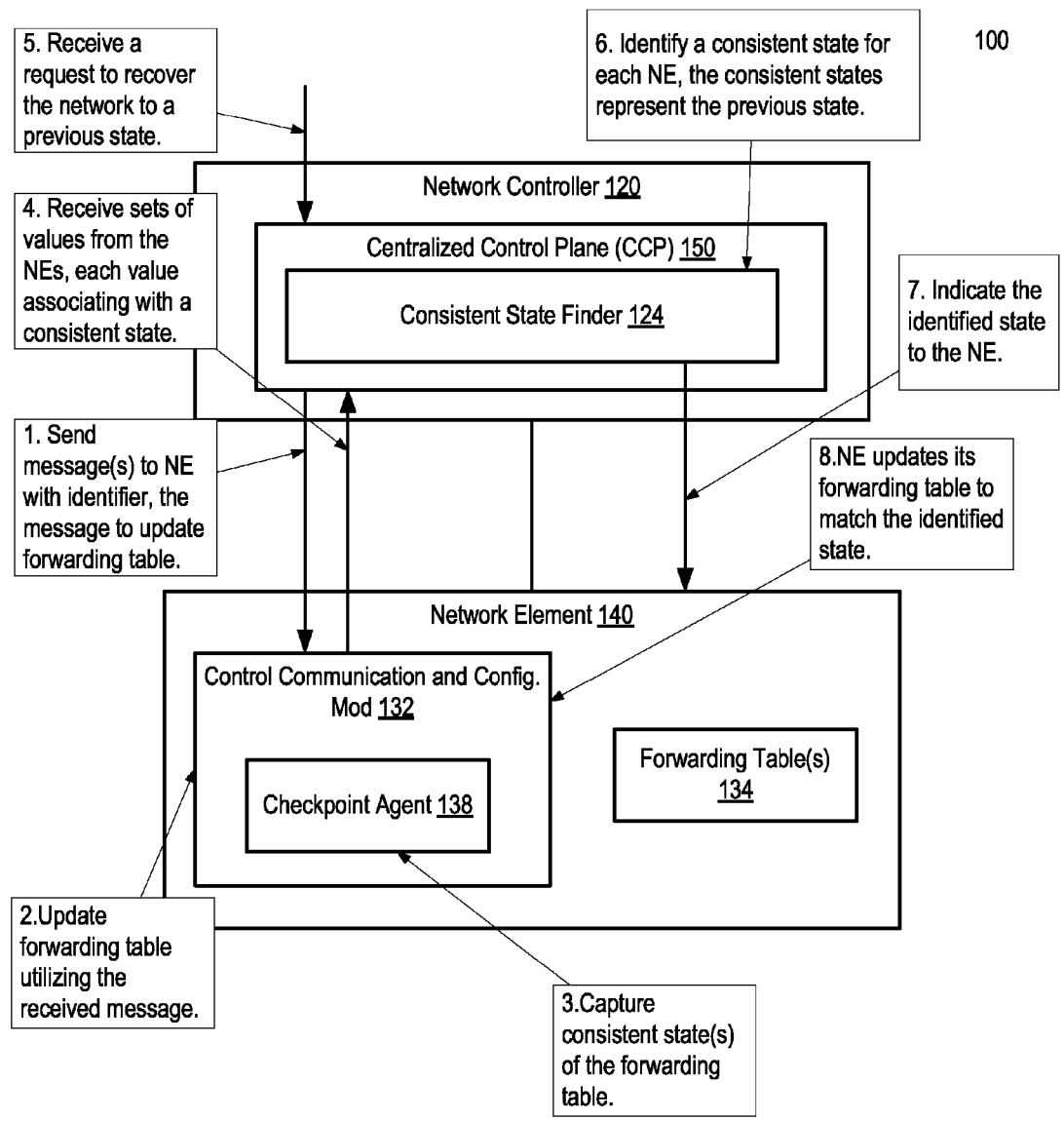
FIG. 1 is a block diagram illustrating the architecture and operations for checkpoint and rollback recovery according to one embodiment of the invention.

In the following description, numerous specific details are set forth. However, it is understood that embodiments of the invention may be practiced without these specific details. In other instances, well-known circuits, structures and techniques have not been shown in detail in order not to obscure the understanding of this description. It will be appreciated, however, by one skilled in the art that the invention may be practiced without such specific details. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Bracketed text and blocks with dashed borders (e.g., large dashes, small dashes, dot-dash, and dots) may be used herein to illustrate optional operations that add additional features to embodiments of the invention. However, such notation should not be taken to mean that these are the only options or optional operations, and/or that blocks with solid borders are not optional in certain embodiments of the invention.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other. A "set," as used herein refers to any positive whole number of items including one item.

An electronic device stores and transmits (internally and/or with other electronic devices over a network) code (which is composed of software instructions and which is sometimes referred to as computer program code or a computer program) and/or data using machine-readable media (also called computer-readable media), such as machine-readable storage media (e.g., magnetic disks, optical disks, read only memory (ROM), flash memory devices, phase change memory) and machine-readable transmission media (also called a carrier) (e.g., electrical, optical, radio, acoustical or other form of propagated signals—such as carrier waves, infrared signals). Thus, an electronic device (e.g., a computer) includes hardware and software, such as a set of one or more processors coupled to one or more machine-readable storage media to store code for execution on the set of processors and/or to store data. For instance, an electronic device may include non-volatile memory containing the code since the non-volatile memory can persist code/data even when the electronic device is turned off (when power is removed), and while the electronic device is turned on that part of the code that is to be executed by the processor(s) of that electronic device is typically copied from the slower non-volatile memory into volatile memory (e.g., dynamic random access memory (DRAM), static random access memory (SRAM)) of that electronic device. Typical electronic devices also include a set or one or more physical network interface(s) to establish network connections (to transmit and/or receive code and/or data using propagating signals) with other electronic devices. One or more parts of an embodiment of the invention may be implemented using different combinations of software, firmware, and/or hardware.

Rationale and Features of Checkpoint and Rollback in a SDN System

Error recovery through checkpoint and rollback is very useful for long-running applications such as scientific computing and telecommunication applications, where restarting from the beginning can be costly. Besides host-level process migration and debugging, this technique can be used for error recovery in distributed systems, where a collection of application processes are checkpointed distributively and a globally consistent state is restored.

Despite its usefulness, checkpoint-recovery mechanism is rarely used in a networking infrastructure for the following reasons. First, a network interacts with the outside world constantly, i.e., receiving packets and sending them out, and the outside world cannot be rolled back. Second, a traditional checkpoint-recovery mechanism assumes a fail-stop system, i.e., upon any fault or failure, the process or system terminates. This assumption may not hold true in a networking infrastructure. For example, a loop may exist for a non-negligible amount of time before it is detected, even if it hurts network performance. Third, network equipment and applications mostly operate as black boxes to the operators, making it challenging to instrument and reason. Thus, the fault recovery process in today's network typically do not use checkpoint-recovery and is still error-prone.

Yet, as discussed herein below, a software-defined networking (SDN) system contains properties that make checkpoint and rollback feasible, such as its simple abstraction, network-wide visibility, and direct control. In a SDN system, forwarding states of network elements are maintained through forwarding table entries (or flow entries, flow table entries) of network elements of the SDN system, where the forwarding table entries of the network elements form forwarding tables of the network elements. Thus, the forwarding state of a SDN system can be abstracted as a distributed collection of forwarding tables (also referred to as flow tables) on the network elements, managed by a logically centralized network controller with a global view.

Indeed, checkpoint and rollback can be essential to a SDN system, and it can achieve many goals in the SDN system:

Fast failure recovery: Operators are required to minimize network downtime during failures. Examples of data plane failures include network element going down, connectivity failure (e.g., OpenFlow channel connection interruption), etc. It is important that the forwarding state is recovered to its intended operational state as quickly as possible. In most implementations today, after such failures, the forwarding table entries of network elements (e.g., an OpenFlow switch) are removed and later relearned gradually. This process introduces overhead and performance degradation, due to the re-computation of the associated forwarding state, surge of requests to the network controller, and delay in rule installation to build the forwarding tables. One way to provide fast recovery is by maintaining a copy of the entire forwarding table in each network element, where the copy will be re-installed automatically at the network elements after the failure through the rollback process.

Efficient misconfiguration correction: Bugs in control plane applications and manual configurations of complex policies often result in errors of the forwarding states of network elements, such as routing loops, violations of access control, etc. While detecting these problems and identifying the root causes are challenging, fixing them in a large distributed environment such as a typical SDN system is equally challenging. Such mitigation often requires changing forwarding states on multiple network elements, which have complex dependencies across them. If the operator keeps a checkpoint of the forwarding state of the SDN system before the misconfiguration, meaning that the forwarding state is correct and consistent among all network elements at that given moment, she can quickly restore the entire network to that checkpoint.

Flexible policy configuration change: At different times, operators may need to apply different policies to their networks for resource optimization, traffic engineering, or other purposes. Switching between different policies requires ad-hoc and error-prone manual changes to the configurations. Through checkpoint and rollback, an operator can keep a checkpoint of the forwarding state before applying a new policy, and when needed, roll back to the checkpointed state of the previous policy.

To Utilize Checkpoint and Rollback Recovery in a SDN System, One May Perform Operations in Three Principal Steps According to One Embodiment of the Invention:

Detecting a fault, containing the fault, and rolling the necessary nodes of the network back to the last checkpoint in order to recover from the fault. Detecting the fault and containing the fault may utilize techniques known in the art. Embodiments of the invention provide solutions for the third step, i.e., checkpointing and performing rollback so that the SDN system can function correctly. More precisely, embodiments of the invention provide an efficient framework that allows the forwarding state of the entire network to roll back to a consistent and correct global state. Note that the state may or may not be identical to any previous states, depending on the external events and the types of the fault, but it still satisfies the network-wide correctness and consistency properties.

Embodiments of the Invention Provide a Light-Weight and Distributed Checkpointing Frame for SDN Forwarding Tables of Network Elements. Three Key Challenges are Identified and Addressed:

How to accurately capture snapshots of forwarding states on the network elements, how to minimize the checkpoint overhead, and how to ensure that the selected forwarding states are consistent across different network elements. In order to address the first two challenges, an embodiment of the invention installs a checkpoint agent on the network element to create checkpoints periodically in an asynchronous manner, which allows each network element to create a snapshot when it has free cycle to run. In order to address the last challenge and combine the individual snapshots into a global state with consistency across different network elements, an embodiment of the invention utilizes an algorithm on the network controller (also referred to as SDN controller) to determine globally consistent states in the rollback phase.

Thus, embodiments of the invention (1) define a model of checkpointing and rollback for SDN forwarding states; (2) propose a framework that enables instrumenting the states on the network elements of a SDN system in a distributed manner to achieve low overhead; and (3) develop an algorithm to efficiently identify the consistent state within minimum amount of rollback, which effectively prevents losing too many states before the failure and prevents causing inconsistencies between the network elements.

Storing Forwarding States of a SDN System

A SDN system contains a network controller and a set of network elements forwarding traffic. Each network element may be abstracted as a forwarding table with forwarding table entries (or flow entries, flow table entries) that determine how arrived packets should be processed and forwarded. In order to perform checkpointing, snapshots of forwarding tables on each network element need to be collected and saved. Since rules to generate forwarding table entries of forwarding tables are installed by the network controller, the straightforward way is to let the network controller keep track of the set of rules installed on each network element and then consider it as a part of the controller state. However, existing network controllers appear not to maintain a copy of the forwarding tables for the network elements, likely because of the concerns of space and overhead.

One may argue that the forwarding states of network elements are transient state installed by the network controller, thus there is no need to store them explicitly. Instead, they can be regenerated by the network controller at any time if needed. However, in order to make the rollback efficient, flexible, and general, embodiments of the invention maintain the forwarding table explicitly. It is likely more efficient to develop mechanisms to regenerate state internally, based on a smaller set of forwarding states for the following reasons:

First, to recompute the forwarding states of the network elements, the network controller needs to be fed with a history of past events, which may be a full trace of every network event for all the time. Even through the operators may select the important events, the process would require human intervention and the operators may not have the right knowledge for different applications. Moreover, replaying all the events to the network controller from the beginning may be time consuming.

Second, keeping the forwarding states of individual network elements allows fast restoration for transient failures of the network elements, where a transient failure is a typical of common faults in the SDN system. When the network element is down for a short duration, the SDN recovery mechanism may restore the last checkpoint and replay the delta set of messages from the network controller to the network element since the last checkpoint. This approach reduces the workload on the network controller upon a transient failure of a single network element in the SDN system. It also eases the job for upgrading the software on the network elements.

Third, the framework of separately maintaining checkpoints for network elements is more general and can be easily extended to multi-controller scenarios, where each network element can be controlled by multiple network controllers simultaneously.

The cost of checkpointing varies with the amount of forwarding state information required to be saved. Thus, two types of snapshots of forwarding tables of each network element can be implemented. One is a full snapshot, which records the consistent state of the full forwarding state of the network element. The other is an incremental snapshot, which records the different of a consistent state of the forwarding state of the network element from a prior snapshot. The rollback mechanism picks one version of the forwarding table and then modifies the current forwarding table accordingly.

The checkpoint of forwarding tables can be done either centrally or distributively. The centralized approach requires a middle layer that sits between the network controller and the network elements (either on the same physical box as the network controller or on a separate proxy box). In this middle-layer design, all messages exchanged between the network controller and the network elements are logged. The forwarding table of each network element can then be reconstructed and periodically stored for checkpointing. This approach, however, has several drawbacks:

The middle layer introduces extra delay into the delivery of messages in both directions. Sitting in the same physical box as the network controller may further increase the load on the physical box, likely a computer sever or other computing device.

It is not guaranteed that the messages sent to a network element are correctly received and cause forwarding entries installed correctly into the network element's forwarding table. A forwarding table entry may not be correctly installed as instructed by the network controller due to a variety of reasons such as conflicting flows, table overflow, timeout, flow updates without notification, or bugs of the network elements. This could result in mismatch between the checkpointed state and the actual forwarding state of the network element.

A centralized approaching for checkpointing all the network elements is not scalable as the number of network elements and forwarding table entries increase. Moreover, if the network elements are controlled by multiple network controllers, the middle layer has to be distributed itself, which adds to the complexity of the design.

Because of the above drawbacks, embodiments of the invention take a distributed approach and each network element is responsible for checkpointing its own state. For rollback recovery, the recovery mechanism performs some coordination between the network controller and the network elements, selects a network-wide consistent set of previously collected checkpoints, and rolls each network element back to the checkpoint selected for that network element. Note that it is NOT required to do the checkpointing of all network elements at the same time. Individual checkpoints can be collected independently, for example, when there are spare CPU cycles on the corresponding network elements. Thus, the recovery mechanism does not rely on time synchronization to guarantee consistency which may not always be accurate. Moreover, since the checkpointing may be performed at different times, the operations will not be selectively performed when the network element is not busy or in a congested state, thus not cause performance degradation of the network element.

With the distributed approach, the checkpoint of each network element can be restored locally and/or directly by the software/system that run on the network element. This eliminates the need to download all the forwarding table entries from the network controller, which may congest the control path.

The distributed approach may require extra storage space on or coupled to the network element. This may not be an issue for a network element implemented as virtual network element sharing hardware with other virtual network elements. For a single network element implemented on a network device, one may attach an external storage to the network element, or the checkpoint data can be stored on a dedicated server connected to the SDN system, where the dedicated server can be reached by all the network elements via a data plane path.

Architecture and Operations

FIG. 1 is a block diagram illustrating the architecture and operations for checkpoint and rollback recovery according to one embodiment of the invention. Network 100 is a SDN system, which contains a network controller 120, and a set of network elements exemplified by network element 140. Note even though only network element 140 is illustrated for simplicity of illustration, generally a SDN system contains multiple network elements. The components of network controller 120 and network element 140 are discussed in more details in connection to FIGS. 7A-F and 8 herein below. Here only the components essential to embodiments of the inventions are illustrated. Task boxes 1 to 8 illustrate the order in which operations are performed according to one embodiment of the invention.

At task box 1, network controller 120 sends messages to network element 140. Each message contains an identifier, which indicates an order of the messages. The identifier may be unique for each message, and by comparing the identifiers of two messages, one may be able to determine which message was sent out earlier. The identifier can be a number such as transaction identifier (ID) of OpenFlow messages if the SDN system complies with OpenFlow standards. The identifier can also be a timestamp marking the time a message is sent from the network element. Through the unique number, timestamp, or other ways, each identifier uniquely associates the message with a moment in time.

The messages are control messages, which may contain rules to update forwarding tables of network elements. At network element 140, control communication and configuration module 132 receives the messages and updates its forwarding table(s) 134 based on the message at task box 2.

Control communication and configuration module 132 also contains checkpoint agent 138, which is responsible for capturing consistent states of forwarding table(s) 134 at task box 3. Checkpoint agent 138 may capture the consistent states through a snapshot operation, where the checkpoint agent 138 freezes forwarding table(s) 134 momentarily and copies the value within the forwarding table(s) at a particular moment in time. Each consistent state of forwarding table(s) 134 is associated with an identifier (e.g., the identifier of last message received to update the forwarding table(s) 134) to identify the order of the consistent state. The identifier may be embedded in the consistent state data or stored elsewhere. The capture of consistent states of the forwarding tables may be performed using techniques similar to the ones used for capturing the consistent state of storage and/or backup systems. Note that operations in task box 3 may be performed periodically throughout the lifetime of network element 140, and some captures are prior to and others are after the receiving of messages to update forwarding table(s) 134 at task box 2. The capture may be performed upon determining that network element 140 is not busy (e.g., activity of the network element in aggregation is below a predetermined threshold), thus having free processing power (CPU cycle) to perform the operation. The captured consistent states of forwarding table(s) 134 may be stored locally in a storage coupled to network element 140.

At task box 4, network controller 120 receives sets of values from network elements, where each set of values was sent from network elements such as network element 140. Each set of values are associated with consistent states captured by one network element. Within each set, the values are associated with a series of consistent states captured by the associated network element. The set of values includes identifiers identifying the order of the consistent states. Note since the identifiers were originally sent by network controller 120 in a sequential order, the identifiers of the sets of values may be used to determining the order in time of all the captured consistent states across the network elements.

At task box 5, centralized control plane 150 receives a request to recover the network to a previous state. The request may be triggered by detecting a fault. Network controller 120 may perform operations to contain the fault first, and then request to recover the network to the previous state thus starting the rollback recovery process. Note task boxes 4 and 5 may be performed in the opposite order. That is, while the sets of values associated with the consistent states for the network elements may be sent prior to receiving the request as illustrated, the sets of values may be received after receiving the request. For example, in response to receiving the request, network controller 120 sends inquiries to network elements, and network elements send the sets of values in response to the inquiries.

At task box 6, consistent state finder 124 of centralized control plane 150 identifies a consistent state for each network element from which the sets of consistent states were received. The consistent states of the network elements together form the previous state of the network. At task box 7, consistent state finder 124 indicates the identified consistent states to corresponding network elements. At task box 8, the corresponding network element update its forwarding table to match the identified consistent state if the forwarding table is inconsistent with the identified consistent state.

Figure 2:
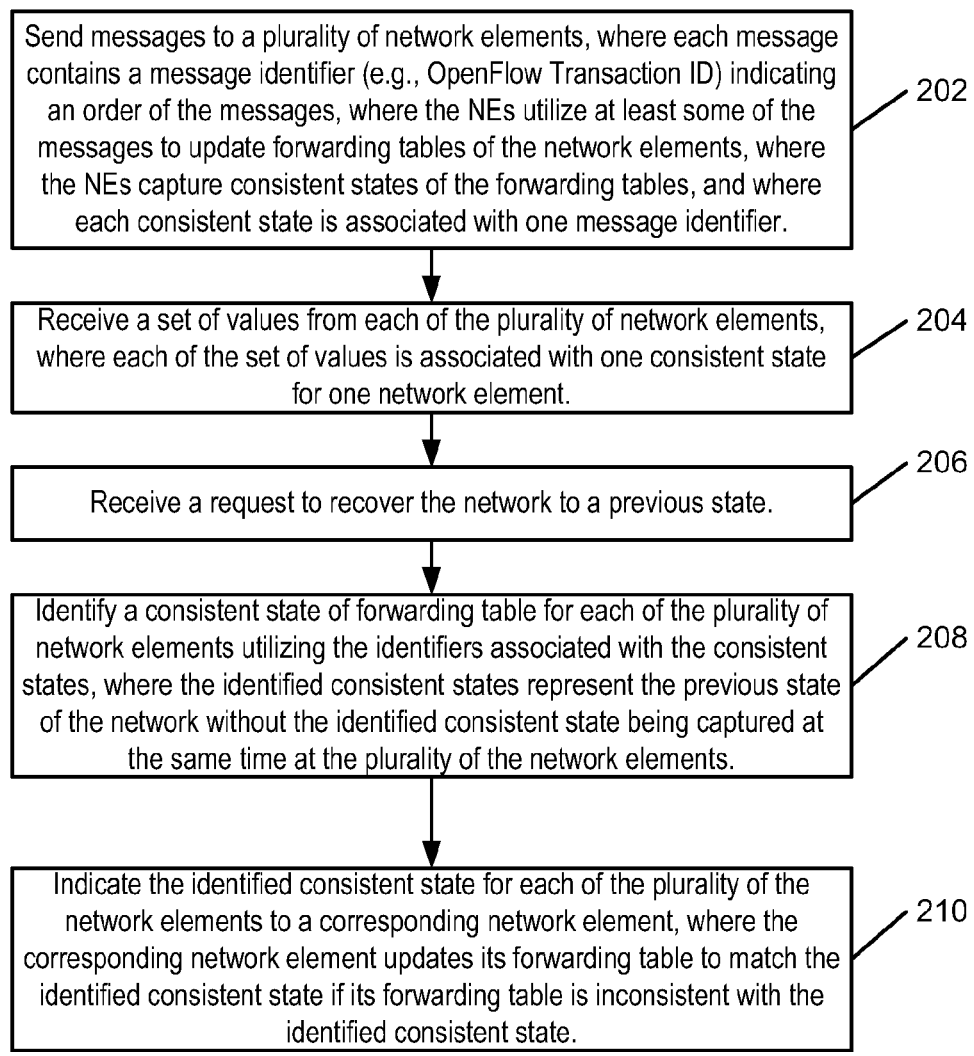
FIG. 2 is a flow diagram illustrating the operations of a network controller of a SDN system for checkpoint and rollback recovery according to one embodiment of the invention.

FIG. 2 is a flow diagram illustrating the operations of a network controller of a SDN system for checkpoint and rollback recovery according to one embodiment of the invention. Method 200 can be implemented in network controller 120, more specifically centralized control plane 150 of FIG. 1, where the SDN system is a network containing a network controller and a plurality of network elements.

Method 200 starts with reference 202, where the network controller sends messages to a plurality of network elements of the SDN System. Each message contains a message identifier indicating an order of the message. The network elements utilize at least some of the messages to update forwarding tables of the network elements. The network elements capture consistent states of forwarding tables of the network elements, and each consistent state is associated with one message identifier. The message identifier is a number such as a transaction identifier (ID) of an OpenFlow message in one embodiment of the invention. The consistent state may be captured through taking snapshot of the forwarding tables in one embodiment as discussed herein.

At reference 204, the network controller receives a set of values from each of the plurality of network elements, where each of the set of values is associated with one consistent state for one network element. At reference 206, the network controller receives a request to recover the network to a previous state. As discussed herein, the operations of references 204 and 206 may be performed in the opposite order as illustrated, where the receipt of the set of values occurs after and/or in response to receiving the request to recover the network.

At reference 208, the network controller identifies a consistent state of forwarding table for each of the plurality of network elements utilizing the message identifiers associated the consistent states, where the identified consistent states represent the previous state of the network without the identified consistent states being captured at the same time at the plurality of network elements. In other words, the identified consistent states of the network elements are correct and consistent with each other without being captured at the same time.

At reference 210, the network controller indicates the identified consistent state for each of the plurality of the network elements to a corresponding network element, where the corresponding network element updates its forwarding table to match the identified consistent state if its forwarding table is inconsistent with the identified consistent state. The indication may be a message sending to the network elements, so that the network element is notified the need to update its forwarding state. The indication may also be noticed by the network element through the network element's polling of the network controller.

Though operations in references 202-210, the network controller identifies a previous state for the network to roll back to through checkpoints captured by the consistent states. The roll back is performed by the network elements.

Figure 3:
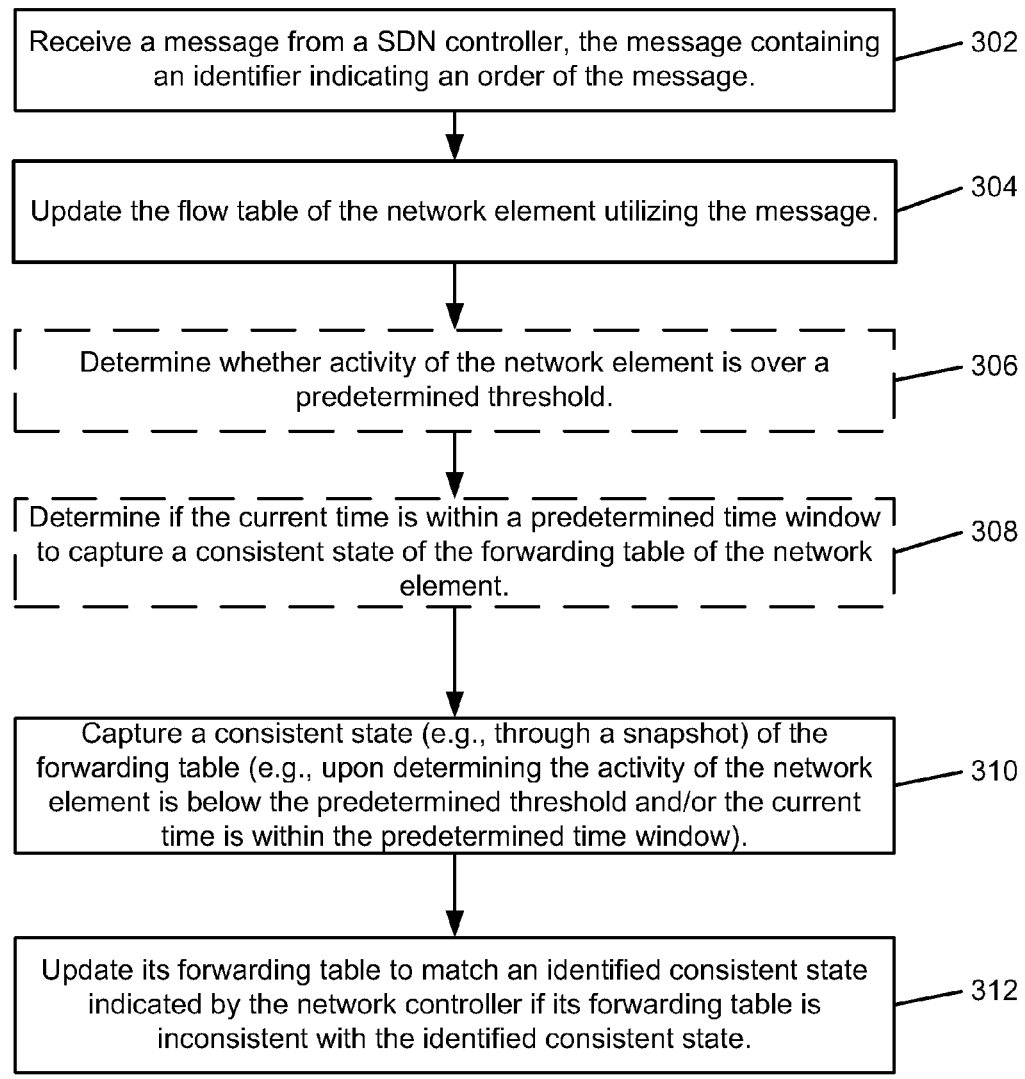
FIG. 3 is a flow diagram illustrating the operations of a network element of a SDN system for checkpoint and rollback recovery according to one embodiment of the invention.

FIG. 3 is a flow diagram illustrating the operations of a network element of a SDN system for checkpoint and rollback recovery according to one embodiment of the invention. Method 300 can be implemented in network element 140, more specifically control communication and configuration module 132 of FIG. 1, where the SDN system is a network containing a network controller and a plurality of network elements.

Method 300 starts with reference 302, where the network element receives a message from the network controller of the SDN System. The message contains a message identifier indicating an order of the message as seen by the network controller. At reference 304, the network element updates the forwarding table of the network element utilizing the message, which may contain forwarding rules for the forwarding table to install forwarding entries.

Optionally at reference 306, the network element determines whether activity of the network element is over a predetermined threshold. The activity of the network element may be quantized to be a value (e.g., a percentage of CPU usage, a number of ongoing tasks, and a percentage of network bandwidth consumption). Also optionally at reference 308, the network element determines whether the current time is within a predetermined time window for capturing a consistent state of the forwarding table of the network element. That is, the network may provide a time window for all of the plurality of network elements to obtain checkpoints through capturing consistent states of the forwarding tables within the time window.

At reference 310, the network element captures a consistent state of the forwarding table. The capturing may be performed through snapshots of the forwarding table, and it may be performed only after determining that the activity of the network element is below the predetermined threshold and/or the current time is within the predetermined time window. Note operations in reference 310 may be performed many times thus create a series of consistent states of the forwarding table as a series of checkpoints of the network element.

At reference 312, the network element updates its forwarding table to match an identified consistent state indicated by the network controller, if its forwarding table is inconsistent with the identified consistent state. The update may be preceded by a notification of the identified consistent state, thus the update is in response to the notification. It may also be preceded by a polling of the network controller, from which the network element is aware of the identified consistent state.

Though operations in references 302-312, the network element captures a series of checkpoints of the network element, and based on the input from the network controller (e.g., consistent state finder 124 in FIG. 1), it updates its forwarding table to roll back to a checkpoint as a part of the previous state for the network.

Identify Consistent Checkpoints Across Network Elements

Of the operations discussed in FIGS. 1-3 for checkpoint and roll back recovery, one challenge is to identify consistent checkpoints across network elements. That is, which checkpoint on each of network elements to pick results in a network-wide consistent forwarding state. Embodiments of the invention propose ways to identify the consistent checkpoints across the network elements of a SDN system.

In a SDN system, networks constantly go through configuration, policy, or topology changes. Each of these high-level changes may result in a set of changes in the forwarding tables of network elements, and a high-level change is referred to as a network update. A network update may not impact the forwarding table of every network element.

Figure 4:
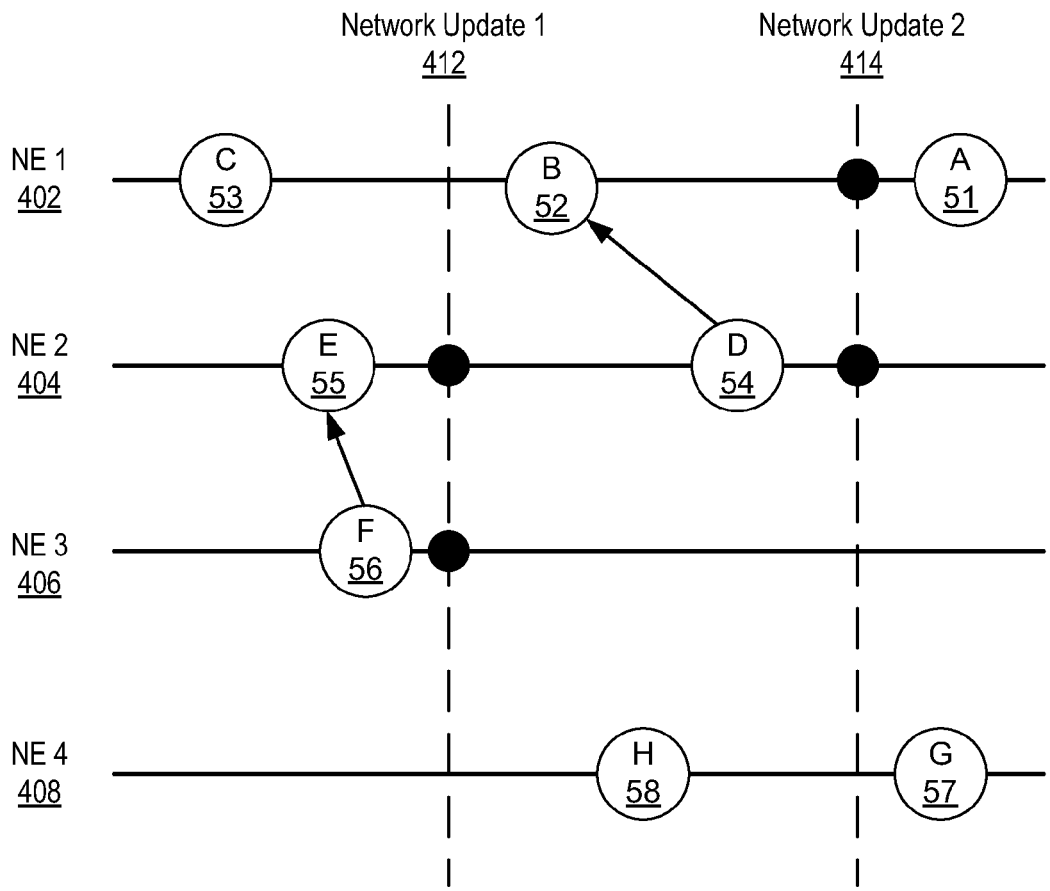
FIG. 4 illustrates network updates and identification of consistent checkpoints across network elements according to one embodiment of the invention.

FIG. 4 illustrates network updates and identification of consistent checkpoints across network elements according to one embodiment of the invention. There are four network elements NE 1-NE 4 at references 402-408 respectively. Network update 1 at reference 412 results in a change of the forwarding tables of NE 2 and NE 3, but not NE 1 or NE 4. The impact on a network element is illustrated with a solid cycle crossing the NEs and the network update line. Similarly, network update 2 at reference 414 results in a change of the forwarding tables of NE1 and NE 2, but not NE 3 or NE 4. The change of the forwarding tables includes adding to, removing from, or modifying the forwarding tables of the network elements.

The checkpoints A-H at references 51-58 respectively are the consistent states of the network elements, and they are captured at different network elements. Two checkpoints collected by two network elements are consistent if there are no network updates in between the two checkpoints that affect both of the network elements. In the example of FIG. 4, this condition translates into having both checkpoints on the same side of a vertical line associated with any update that affect both network elements. For example, checkpoints B and D are consistent as there are no network updates in between the two checkpoints that affect both checkpoints. Neither network update 1 nor network update 2 is in between the checkpoints. Similarly, checkpoints C and D are consistent. However, checkpoints A and D are inconsistent as network update 2 is in between the two checkpoints and affects both checkpoints.

Note that the consistency determination does not include any assumptions on time synchronization between the network elements. This can be done because each checkpoint is a consistent state of the forwarding state of a network element, where the consistent state is associated with a message identifier sent by the network controller. The message identifier indicates the order of the message determined by the network controller. Since the network controller has a global view of the whole network, it can determine the order in time of all the checkpoints, and their relationship with the network updates—whether a checkpoint occurs prior to or after a network update. Also, the network controller knows which network update affects what network element, thus the network controller may sequence all the checkpoints and network updates (e.g., through transaction IDs if the operations of the network controller comply with the OpenFlow standard).

In order to establish a network-wide consistent set of checkpoints, all pair-wise checkpoints need to be consistent. In one embodiment, a systematic approach is utilized to search for consistent checkpoints across multiple network elements using a directed graph.

Maximum Recoverable Checkpoints (MRCs):

Across time, there can be multiple consistent checkpoints for the network elements to roll back to. However, a network operator likely wants to go back to the most recent checkpoints so that the amount of lost information is minimized. The maximum recoverable checkpoints of a SDN system is defined as the latest set of checkpoints where each network element can be rolled back to yet the network-wide consistency condition is satisfied.

In order to form dependencies between checkpoints, one may model all the checkpoints as a directed graph called Checkpoint Graph or CPG, where each node represents a checkpoint c and a directed edge shows the dependencies between the checkpoints. The edge can be constructed as the following. For each update $ID_k$ that occurs at time $[t_k, t_{k+1}]$, for any pair of network elements m and n that $ID_k$ affects, if for each pair of checkpoints $c_i^m$ and $c_j^n$, where $i<t_k, j>t_{k+1}$, meaning that one checkpoint is taken before $ID_k$ and one is after, then these two checkpoints are inconsistent, an edge is then added from $c_i^m$ to the last checkpoint of n before t.

The CPG may be illustrated through FIG. 4. NE 1 and NE 2 are both affected by network update 2, but NE 1's checkpoint A is taken after network update 2 and NE 2's checkpoint D is before. According to the edge definition above, an edge is added from D (the one before network update 2) to B (the last checkpoint of NE 1 before network update 2. Similarly, because of checkpoints D and F are on the two sides of network update 1, an edge is added from F to E. Essentially an edge from x to y means that if one is roll back to checkpoint x, then the other should be back to at least y, if not further.

FIG. 5 is a pseudo code program illustrating an algorithm for identifying the maximum recoverable checkpoints of a SDN system according one embodiment of the invention. The pseudo code program may be performed by a network controller such as network controller 120, more specifically consistent state finder 124 of FIG. 1.

The algorithm takes input of a set of checkpoints C of the network of the SDN system, initial maximum recoverable checkpoints (MRC) M, and a set of network updates T. The set of checkpoints C contains values associated with consistent states collected from the network elements of the network and it contains identifiers identifying an order of the checkpoints. The network updates also contain identifiers identifying the order of the updates and also the network elements they affect.

The algorithm constructs the nodes of Checkpoint Graph (CPG) from the set of checkpoints C through operations of references 504-506. For each network update t of T, the algorithm examines any pair of affected switches m and n (a switch is an implementation of a network element); if there exists a pair of checkpoints collected at $c_i^m$ for switch m and $c_j^n$ for switch n, and the two are at two sides of t, an edge is added. After the completion of operations in references 504-506, the CPG is constructed.

Then the algorithm forms an initial MRC by including the most recent checkpoints for each switch, e.g., {A, D, F, G} at reference 432 in FIG. 4. However, this set of checkpoints is not necessarily globally consistent. In this example, A and D, D and F are inconsistent. Thus, the algorithm continues operations at reference 508 and traverses through the edges in the CPG from this initial set to any nodes that are reachable in this traversal.

At reference 508, for every element in the MRC, if there is an edge pointing to an earlier checkpoint of the element in the CPG, the earlier checkpoint of the element replaces the current element in the MRC. For example, following the edge D→B in FIG. 4, the algorithm replaces A with B at reference 434 in FIG. 4, as B is an earlier checkpoint of A and it has an edge pointing to it from D. Similarly, following the edge F→E, the algorithm replaces D with E at reference 436 in FIG. 4. The resulting MRC is the final checkpoints of each process in MRC at reference 510. In the corresponding example in FIG. 4, the final MRC is the network-wide consistent checkpoints that is maximum recoverable—the latest set of checkpoints where each network element can be rolled back to yet with network-wide consistency.

Note that there might be a domino effect of the rollback: because of too many dependencies among the network elements, the final MRC might go back too long time ago. In order to avoid this, the network controller may enforce loosely synchronization, where the controller provides a time window for checkpointing to all the network elements (see reference 308 of FIG. 3).

Figure 6:
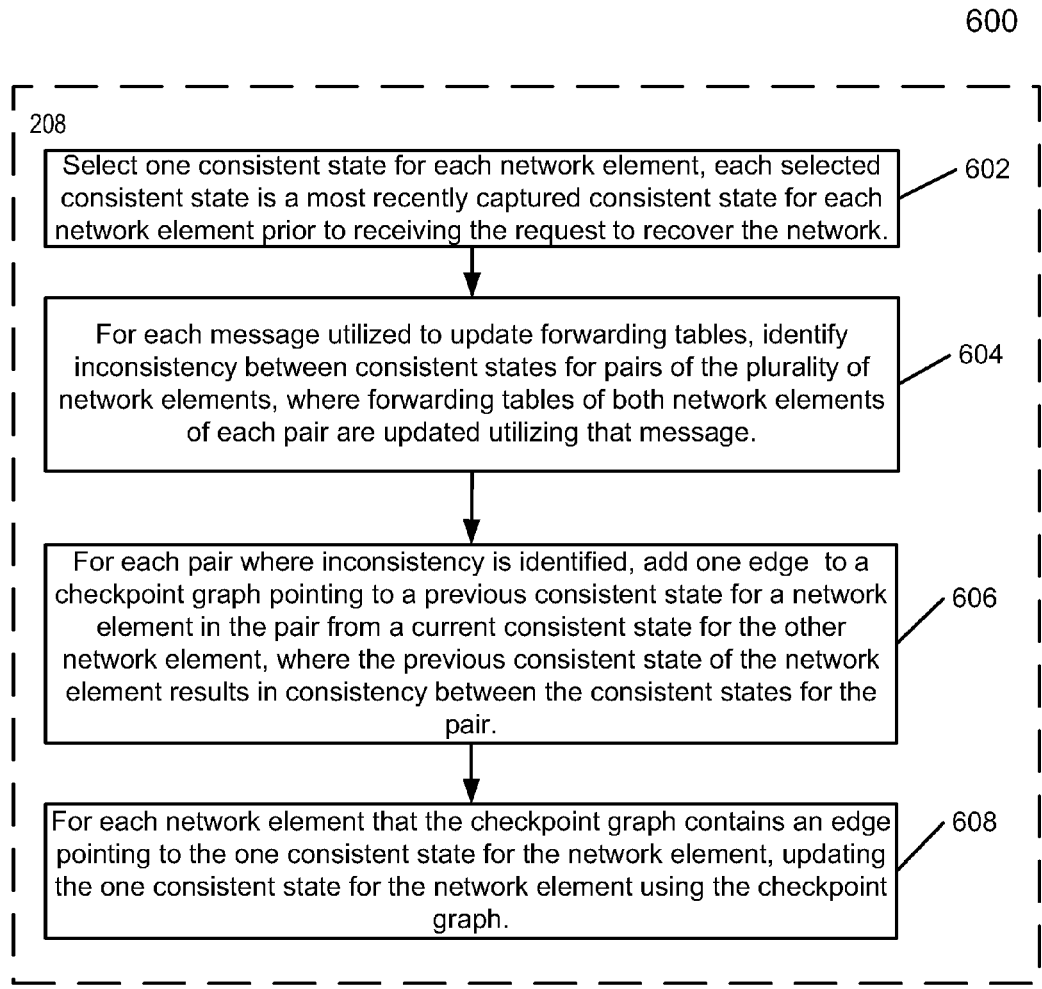
FIG. 6 is a flow diagram illustrating a method for identifying the maximum recoverable checkpoints of a SDN system according one embodiment of the invention.

FIG. 6 is a flow diagram illustrating a method for identifying the maximum recoverable checkpoints of a SDN system according one embodiment of the invention. Method 600 may be performed by a network controller such as network controller 120, more specifically consistent state finder 124 of FIG. 1. Method 600 may be an implementation of reference 208 as illustrated in FIG. 2 in one embodiment.

At reference 602, the network controller selects one consistent state for each network element, the consistent state is a most recently captured consistent state for each network element prior to receiving the request to recover the network.

At reference 604, for each message utilized by the network elements to update forwarding tables of the network elements, the network controller identifies inconsistency between consistent states of pairs of the plurality of network elements, where the forwarding tables of both network elements of each pair are affected by the message.

At reference 606, for each pair where inconsistency is identified, the network controller adds one edge in a checkpoint graph pointing to one previous consistent state for a network element in the pair from a current consistent state for the other network element in the pair, when the previous consistent state of the network element results in consistency between the consistent states for the pair.

Then at reference 608, for each network element that the checkpoint graph contains an edge pointing to the one consistent state for the network element, the network controller updates the one consistent state for the network element using the checkpoint graph. That is, selecting the one previous consistent state for the network element to replace the one consistent state.

SDN and NFV Environment Utilizing Embodiments of the Invention

Embodiments of the invention may be utilized in a SDN and NFV network containing network devices. A network device (ND) is an electronic device that communicatively interconnects other electronic devices on the network (e.g., other network devices, end-user devices). Some network devices are "multiple services network devices" that provide support for multiple networking functions (e.g., routing, bridging, switching, Layer 2 aggregation, session border control, Quality of Service, and/or subscriber management), and/or provide support for multiple application services (e.g., data, voice, and video).

Figure 7A:
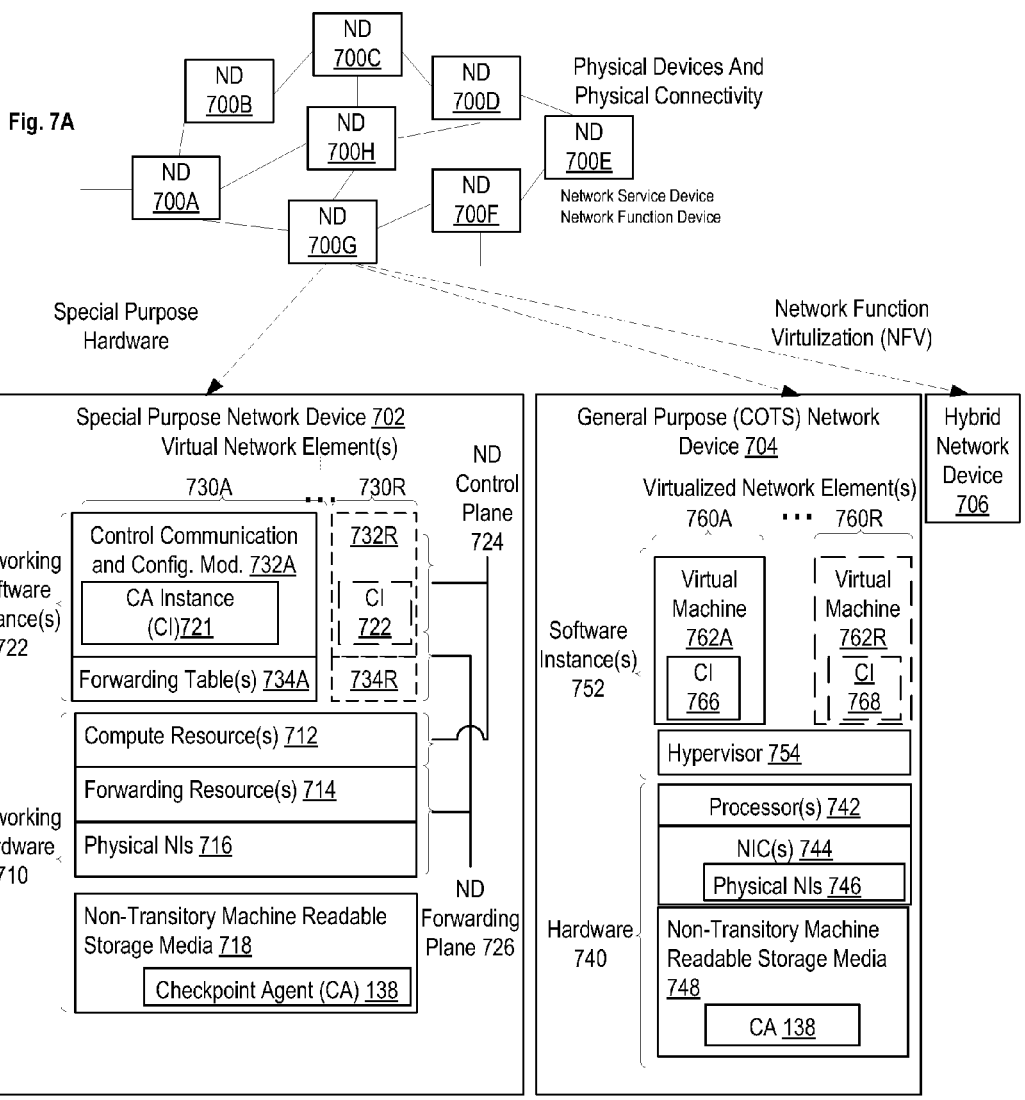
FIG. 7A illustrates connectivity between network devices (NDs) within an exemplary network, as well as three exemplary implementations of the NDs, according to some embodiments of the invention.

FIG. 7A illustrates connectivity between network devices (NDs) within an exemplary network, as well as three exemplary implementations of the NDs, according to some embodiments of the invention. FIG. 7A shows NDs 700A-H, and their connectivity by way of lines between A-B, B-C, C-D, D-E, E-F, F-G, and A-G, as well as between H and each of A, C, D, and G. These NDs are physical devices, and the connectivity between these NDs can be wireless or wired (often referred to as a link). An additional line extending from NDs 700A, E, and F illustrates that these NDs act as ingress and egress points for the network (and thus, these NDs are sometimes referred to as edge NDs; while the other NDs may be called core NDs).

Two of the exemplary ND implementations in FIG. 7A are: 1) a special-purpose network device 702 that uses custom application—specific integrated—circuits (ASICs) and a proprietary operating system (OS); and 2) a general purpose network device 704 that uses common off-the-shelf (COTS) processors and a standard OS.

The special-purpose network device 702 includes networking hardware 710 comprising compute resource(s) 712 (which typically include a set of one or more processors), forwarding resource(s) 714 (which typically include one or more ASICs and/or network processors), and physical network interfaces (NIs) 716 (sometimes called physical ports), as well as non-transitory machine readable storage media 718 having stored therein networking software, such as checkpoint agent (CA) 138, which is a software module configured on special purpose network device 702 for collecting checkpoints (capturing consistent states of virtual network elements 730A-730R). A physical NI is hardware in a ND through which a network connection (e.g., wirelessly through a wireless network interface controller (WNIC) or through plugging in a cable to a physical port connected to a network interface controller (NIC)) is made, such as those shown by the connectivity between NDs 700A-H. During operation, the checkpoint agent 720 may be executed by the networking hardware 710 to instantiate a set of one checkpoint agent instance 721, one per VNE. Each of the checkpoint agent instance 721, and that part of the networking hardware 710 that executes that checkpoint agent instance (be it hardware dedicated to that networking software instance and/or time slices of hardware temporally shared by that networking software instance with others of the checkpoint agent instance 722), form a separate virtual network element 730A-R. Each of the virtual network element(s) (VNEs) 730A-R includes a control communication and configuration module 732A-R (sometimes referred to as a local control module or control communication module) and forwarding table(s) 734A-R, such that a given virtual network element (e.g., 730A) includes the control communication and configuration module (e.g., 732A), a set of one or more forwarding table(s) (e.g., 734A), and that portion of the networking hardware 710 that executes the virtual network element (e.g., 730A).

The special-purpose network device 702 is often physically and/or logically considered to include: 1) a ND control plane 724 (sometimes referred to as a control plane) comprising the compute resource(s) 712 that execute the control communication and configuration module(s) 732A-R; and 2) a ND forwarding plane 726 (sometimes referred to as a forwarding plane, a data plane, or a media plane) comprising the forwarding resource(s) 714 that utilize the forwarding table(s) 734A-R and the physical NIs 716. By way of example, where the ND is a router (or is implementing routing functionality), the ND control plane 724 (the compute resource(s) 712 executing the control communication and configuration module(s) 732A-R) is typically responsible for participating in controlling how data (e.g., packets) is to be routed (e.g., the next hop for the data and the outgoing physical NI for that data) and storing that routing information in the forwarding table(s) 734A-R, and the ND forwarding plane 726 is responsible for receiving that data on the physical NIs 716 and forwarding that data out the appropriate ones of the physical NIs 716 based on the forwarding table(s) 734A-R.

Figure 7B:
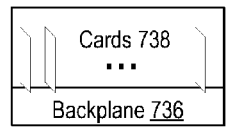
FIG. 7B illustrates an exemplary way to implement the special-purpose network device 702 according to some embodiments of the invention.

FIG. 7B illustrates an exemplary way to implement the special-purpose network device 702 according to some embodiments of the invention. FIG. 7B shows a special-purpose network device including cards 738 (typically hot pluggable). While in some embodiments the cards 738 are of two types (one or more that operate as the ND forwarding plane 726 (sometimes called line cards), and one or more that operate to implement the ND control plane 724 (sometimes called control cards)), alternative embodiments may combine functionality onto a single card and/or include additional card types (e.g., one additional type of card is called a service card, resource card, or multi-application card). A service card can provide specialized processing (e.g., Layer 4 to Layer 7 services (e.g., firewall, Internet Protocol Security (IPsec) (RFC 4301 and 4309), Secure Sockets Layer (SSL)/Transport Layer Security (TLS), Intrusion Detection System (IDS), peer-to-peer (P2P), Voice over IP (VoIP) Session Border Controller, Mobile Wireless Gateways (Gateway General Packet Radio Service (GPRS) Support Node (GGSN), Evolved Packet Core (EPC) Gateway)). By way of example, a service card may be used to terminate IPsec tunnels and execute the attendant authentication and encryption algorithms. These cards are coupled together through one or more interconnect mechanisms illustrated as backplane 736 (e.g., a first full mesh coupling the line cards and a second full mesh coupling all of the cards).

Returning to FIG. 7A, the general purpose network device 704 includes hardware 740 comprising a set of one or more processor(s) 742 (which are often COTS processors) and network interface controller(s) 744 (NICs; also known as network interface cards) (which include physical NIs 746), as well as non-transitory machine readable storage media 748 having stored therein checkpoint agent 138. During operation, the processor(s) 742 execute the checkpoint agent 750 to instantiate a hypervisor 754 (sometimes referred to as a virtual machine monitor (VMM)) and one or more virtual machines 762A-R that are run by the hypervisor 754, which are collectively referred to as software instance(s) 752. A virtual machine is a software implementation of a physical machine that runs programs as if they were executing on a physical, non-virtualized machine; and applications generally do not know they are running on a virtual machine as opposed to running on a "bare metal" host electronic device, though some systems provide para-virtualization which allows an operating system or application to be aware of the presence of virtualization for optimization purposes. Each of the virtual machines 762A-R, and that part of the hardware 740 that executes that virtual machine (be it hardware dedicated to that virtual machine and/or time slices of hardware temporally shared by that virtual machine with others of the virtual machine(s) 762A-R), forms a separate virtual network element(s) 760A-R.

The virtual network element(s) 760A-R perform similar functionality to the virtual network element(s) 730A-R. The checkpoint agent instances 766 and 768 are instantiated in virtual machines 762A to 762R. The hypervisor 754 may present a virtual operating platform that appears like networking hardware 710 to virtual machine 762A, and the virtual machine 762A may be used to implement functionality similar to the control communication and configuration module(s) 732A and forwarding table(s) 734A (this virtualization of the hardware 740 is sometimes referred to as network function virtualization (NFV)). Thus, NFV may be used to consolidate many network equipment types onto industry standard high volume server hardware, physical switches, and physical storage, which could be located in Data centers, NDs, and customer premise equipment (CPE). However, different embodiments of the invention may implement one or more of the virtual machine(s) 762A-R differently. For example, while embodiments of the invention are illustrated with each virtual machine 762A-R corresponding to one VNE 760A-R, alternative embodiments may implement this correspondence at a finer level granularity (e.g., line card virtual machines virtualize line cards, control card virtual machine virtualize control cards, etc.); it should be understood that the techniques described herein with reference to a correspondence of virtual machines to VNEs also apply to embodiments where such a finer level of granularity is used.

In certain embodiments, the hypervisor 754 includes a virtual switch that provides similar forwarding services as a physical Ethernet switch. Specifically, this virtual switch forwards traffic between virtual machines and the NIC(s) 744, as well as optionally between the virtual machines 762A-R; in addition, this virtual switch may enforce network isolation between the VNEs 760A-R that by policy are not permitted to communicate with each other (e.g., by honoring virtual local area networks (VLANs)).

The third exemplary ND implementation in FIG. 7A is a hybrid network device 706, which includes both custom ASICs/proprietary OS and COTS processors/standard OS in a single ND or a single card within an ND. In certain embodiments of such a hybrid network device, a platform VM (i.e., a VM that that implements the functionality of the special-purpose network device 702) could provide for para-virtualization to the networking hardware present in the hybrid network device 706.

Regardless of the above exemplary implementations of an ND, when a single one of multiple VNEs implemented by an ND is being considered (e.g., only one of the VNEs is part of a given virtual network) or where only a single VNE is currently being implemented by an ND, the shortened term network element (NE) is sometimes used to refer to that VNE. Also in all of the above exemplary implementations, each of the VNEs (e.g., VNE(s) 730A-R, VNEs 760A-R, and those in the hybrid network device 706) receives data on the physical NIs (e.g., 716, 746) and forwards that data out the appropriate ones of the physical NIs (e.g., 716, 746). For example, a VNE implementing IP router functionality forwards IP packets on the basis of some of the IP header information in the IP packet; where IP header information includes source IP address, destination IP address, source port, destination port (where "source port" and "destination port" refer herein to protocol ports, as opposed to physical ports of a ND), transport protocol (e.g., user datagram protocol (UDP) (RFC 768, 2460, 2675, 4113, and 5405), Transmission Control Protocol (TCP) (RFC 793 and 1180), and differentiated services (DSCP) values (RFC 2474, 2475, 2597, 2983, 3086, 3140, 3246, 3247, 3260, 4594, 5865, 3289, 3290, and 3317).

Figure 7C:
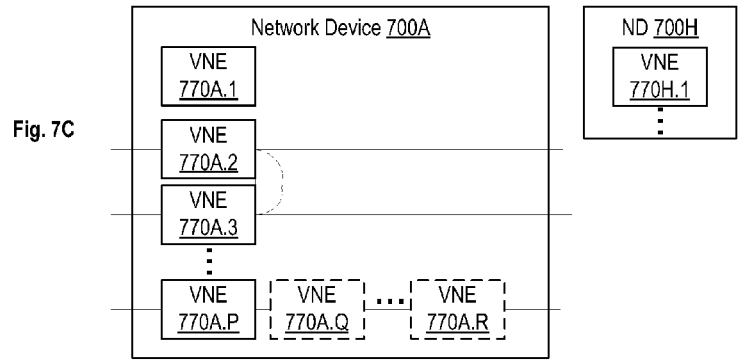
FIG. 7C illustrates various exemplary ways in which virtual network elements (VNEs) may be coupled according to some embodiments of the invention.

FIG. 7C illustrates various exemplary ways in which VNEs may be coupled according to some embodiments of the invention. FIG. 7C shows VNEs 770A.1-770A.P (and optionally VNEs 770A.Q-770A.R) implemented in ND 700A and VNE 770H.1 in ND 700H. In FIG. 7C, VNEs 770A.1-P are separate from each other in the sense that they can receive packets from outside ND 700A and forward packets outside of ND 700A; VNE 770A.1 is coupled with VNE 770H.1, and thus they communicate packets between their respective NDs; VNE 770A.2-770A.3 may optionally forward packets between themselves without forwarding them outside of the ND 700A; and VNE 770A.P may optionally be the first in a chain of VNEs that includes VNE 770A.Q followed by VNE 770A.R (this is sometimes referred to as dynamic service chaining, where each of the VNEs in the series of VNEs provides a different service— e.g., one or more layer 4-7 network services). While FIG. 7C illustrates various exemplary relationships between the VNEs, alternative embodiments may support other relationships (e.g., more/fewer VNEs, more/fewer dynamic service chains, multiple different dynamic service chains with some common VNEs and some different VNEs).

The NDs of FIG. 7A, for example, may form part of the Internet or a private network; and other electronic devices (not shown; such as end user devices including workstations, laptops, netbooks, tablets, palm tops, mobile phones, smartphones, multimedia phones, Voice Over Internet Protocol (VOIP) phones, terminals, portable media players, GPS units, wearable devices, gaming systems, set-top boxes, Internet enabled household appliances) may be coupled to the network (directly or through other networks such as access networks) to communicate over the network (e.g., the Internet or virtual private networks (VPNs) overlaid on (e.g., tunneled through) the Internet) with each other (directly or through servers) and/or access content and/or services. Such content and/or services are typically provided by one or more servers (not shown) belonging to a service/content provider or one or more end user devices (not shown) participating in a peer-to-peer (P2P) service, and may include, for example, public webpages (e.g., free content, store fronts, search services), private webpages (e.g., user-name/password accessed webpages providing email services), and/or corporate networks over VPNs. For instance, end user devices may be coupled (e.g., through customer premise equipment coupled to an access network (wired or wirelessly)) to edge NDs, which are coupled (e.g., through one or more core NDs) to other edge NDs, which are coupled to electronic devices acting as servers. However, through compute and storage virtualization, one or more of the electronic devices operating as the NDs in FIG. 7A may also host one or more such servers (e.g., in the case of the general purpose network device 704, one or more of the virtual machines 762A-R may operate as servers; the same would be true for the hybrid network device 706; in the case of the special-purpose network device 702, one or more such servers could also be run on a hypervisor executed by the compute resource(s) 712); in which case the servers are said to be co-located with the VNEs of that ND.

A virtual network is a logical abstraction of a physical network (such as that in FIG. 7A) that provides network services (e.g., L2 and/or L3 services). A virtual network can be implemented as an overlay network (sometimes referred to as a network virtualization overlay) that provides network services (e.g., layer 2 (L2, data link layer) and/or layer 3 (L3, network layer) services) over an underlay network (e.g., an L3 network, such as an Internet Protocol (IP) network that uses tunnels (e.g., generic routing encapsulation (GRE), layer 2 tunneling protocol (L2TP), IPSec) to create the overlay network).

A network virtualization edge (NVE) sits at the edge of the underlay network and participates in implementing the network virtualization; the network-facing side of the NVE uses the underlay network to tunnel frames to and from other NVEs; the outward-facing side of the NVE sends and receives data to and from systems outside the network. A virtual network instance (VNI) is a specific instance of a virtual network on a NVE (e.g., a NE/VNE on an ND, a part of a NE/VNE on a ND where that NE/VNE is divided into multiple VNEs through emulation); one or more VNIs can be instantiated on an NVE (e.g., as different VNEs on an ND). A virtual access point (VAP) is a logical connection point on the NVE for connecting external systems to a virtual network; a VAP can be physical or virtual ports identified through logical interface identifiers (e.g., a VLAN ID).

Examples of network services include: 1) an Ethernet LAN emulation service (an Ethernet-based multipoint service similar to an Internet Engineering Task Force (IETF) Multiprotocol Label Switching (MPLS) or Ethernet VPN (EVPN) service) in which external systems are interconnected across the network by a LAN environment over the underlay network (e.g., an NVE provides separate L2 VNIs (virtual switching instances) for different such virtual networks, and L3 (e.g., IP/MPLS) tunneling encapsulation across the underlay network); and 2) a virtualized IP forwarding service (similar to IETF IP VPN (e.g., Border Gateway Protocol (BGP)/MPLS IPVPN RFC 4364) from a service definition perspective) in which external systems are interconnected across the network by an L3 environment over the underlay network (e.g., an NVE provides separate L3 VNIs (forwarding and routing instances) for different such virtual networks, and L3 (e.g., IP/MPLS) tunneling encapsulation across the underlay network)). Network services may also include quality of service capabilities (e.g., traffic classification marking, traffic conditioning and scheduling), security capabilities (e.g., filters to protect customer premises from network—originated attacks, to avoid malformed route announcements), and management capabilities (e.g., full detection and processing).

Figure 7D:
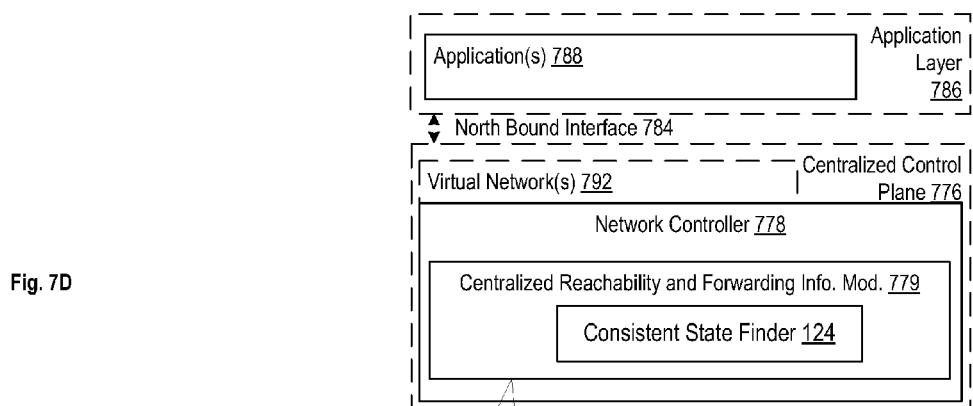
FIG. 7D illustrates a network with a single network element (NE) on each of the NDs of FIG. 7A, and a centralized approach for maintaining reachability and forwarding information (also called network control), according to some embodiments of the invention.

FIG. 7D illustrates a network with a single network element on each of the NDs of FIG. 7A. Specifically, FIG. 7D illustrates network elements (NEs) 770A-H with the same connectivity as the NDs 700A-H of FIG. 7A with a centralized approach for maintaining reachability and forwarding information (also called network control), according to some embodiments of the invention.

FIG. 7D illustrates that a centralized approach 774 (also known as software defined networking (SDN)) that decouples the system that makes decisions about where traffic is sent from the underlying systems that forwards traffic to the selected destination. The illustrated centralized approach 774 has the responsibility for the generation of reachability and forwarding information in a centralized control plane 776 (sometimes referred to as a SDN control module, controller, network controller, OpenFlow controller, SDN controller, control plane node, network virtualization authority, or management control entity), and thus the process of neighbor discovery and topology discovery is centralized. The centralized control plane 776 has a south bound interface 782 with a data plane 780 (sometime referred to the infrastructure layer, network forwarding plane, or forwarding plane (which should not be confused with a ND forwarding plane)) that includes the NEs 770A-H (sometimes referred to as switches, forwarding elements, data plane elements, or nodes). The centralized control plane 776 includes a network controller 778, which includes a centralized reachability and forwarding information module 779 that determines the reachability within the network and distributes the forwarding information to the NEs 770A-H of the data plane 780 over the south bound interface 782 (which may use the OpenFlow protocol). The centralized reachability and forwarding information module 779 contains consistent state finder 124 as illustrated in FIG. 1.

The network intelligence is centralized in the centralized control plane 776 executing on electronic devices that are typically separate from the NDs. For example, where the special-purpose network device 702 is used in the data plane 780, each of the control communication and configuration module(s) 732A-R of the ND control plane 724 typically include a control agent that provides the VNE side of the south bound interface 782. In this case, the ND control plane 724 (the compute resource(s) 712 executing the control communication and configuration module(s) 732A-R) performs its responsibility for participating in controlling how data (e.g., packets) is to be routed (e.g., the next hop for the data and the outgoing physical NI for that data) through the control agent communicating with the centralized control plane 776 to receive the forwarding information (and in some cases, the reachability information) from the centralized reachability and forwarding information module 779 (it should be understood that in some embodiments of the invention, the control communication and configuration module(s) 732A-R, in addition to communicating with the centralized control plane 776, may also play some role in determining reachability and/or calculating forwarding information—albeit less so than in the case of a distributed approach; such embodiments are generally considered to fall under the centralized approach 774, but may also be considered a hybrid approach).

While the above example uses the special-purpose network device 702, the same centralized approach 774 can be implemented with the general purpose network device 704 (e.g., each of the VNE 760A-R performs its responsibility for controlling how data (e.g., packets) is to be routed (e.g., the next hop for the data and the outgoing physical NI for that data) by communicating with the centralized control plane 776 to receive the forwarding information (and in some cases, the reachability information) from the centralized reachability and forwarding information module 779; it should be understood that in some embodiments of the invention, the VNEs 760A-R, in addition to communicating with the centralized control plane 776, may also play some role in determining reachability and/or calculating forwarding information—albeit less so than in the case of a distributed approach) and the hybrid network device 706. In fact, the use of SDN techniques can enhance the NFV techniques typically used in the general purpose network device 704 or hybrid network device 706 implementations as NFV is able to support SDN by providing an infrastructure upon which the SDN software can be run, and NFV and SDN both aim to make use of commodity server hardware and physical switches.

FIG. 7D also shows that the centralized control plane 776 has a north bound interface 784 to an application layer 786, in which resides application(s) 788. The centralized control plane 776 has the ability to form virtual networks 792 (sometimes referred to as a logical forwarding plane, network services, or overlay networks (with the NEs 770A-H of the data plane 780 being the underlay network)) for the application(s) 788. Thus, the centralized control plane 776 maintains a global view of all NDs and configured NEs/VNEs, and it maps the virtual networks to the underlying NDs efficiently (including maintaining these mappings as the physical network changes either through hardware (ND, link, or ND component) failure, addition, or removal).

While FIG. 7D illustrates the simple case where each of the NDs 700A-H implements a single NE 770A-H, it should be understood that the network control approaches described with reference to FIG. 7D also work for networks where one or more of the NDs 700A-H implement multiple VNEs (e.g., VNEs 730A-R, VNEs 760A-R, those in the hybrid network device 706). Alternatively or in addition, the network controller 778 may also emulate the implementation of multiple VNEs in a single ND. Specifically, instead of (or in addition to) implementing multiple VNEs in a single ND, the network controller 778 may present the implementation of a VNE/NE in a single ND as multiple VNEs in the virtual networks 792 (all in the same one of the virtual network(s) 792, each in different ones of the virtual network(s) 792, or some combination). For example, the network controller 778 may cause an ND to implement a single VNE (a NE) in the underlay network, and then logically divide up the resources of that NE within the centralized control plane 776 to present different VNEs in the virtual network(s) 792 (where these different VNEs in the overlay networks are sharing the resources of the single VNE/NE implementation on the ND in the underlay network).

Figure 7E:
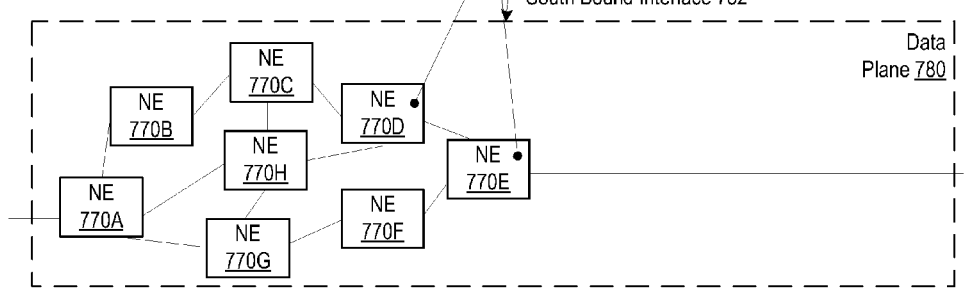
FIG. 7E illustrates the simple case of where each of the NDs 700A-H implements a single NE 770A-H (see FIG. 7D), but the centralized control plane 776 has abstracted multiple of the NEs in different NDs (the NEs 770A-C and G-H) into (to represent) a single NE 770I in one of the virtual network(s) 792 of FIG. 7D, according to some embodiments of the invention.
Figure 7F:
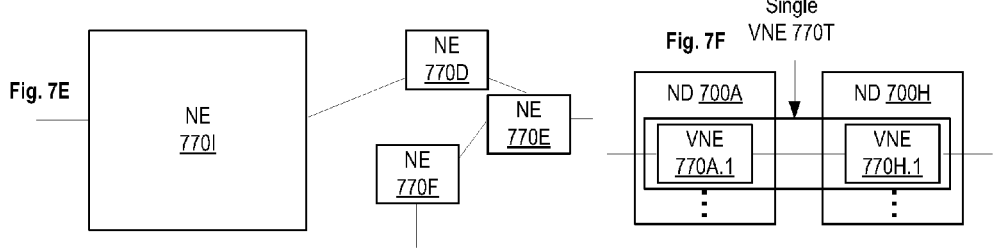
FIG. 7F illustrates a case where multiple VNEs (VNE 770A.1 and VNE 770H.1) are implemented on different NDs (ND 700A and ND 700H) and are coupled to each other, and where the centralized control plane 776 has abstracted these multiple VNEs such that they appear as a single VNE 770T within one of the virtual networks 792 of FIG. 7D, according to some embodiments of the invention.

On the other hand, FIGS. 7E and 7F respectively illustrate exemplary abstractions of NEs and VNEs that the network controller 778 may present as part of different ones of the virtual networks 792. FIG. 7E illustrates the simple case of where each of the NDs 700A-H implements a single NE 770A-H (see FIG. 7D), but the centralized control plane 776 has abstracted multiple of the NEs in different NDs (the NEs 770A-C and G-H) into (to represent) a single NE 770I in one of the virtual network(s) 792 of FIG. 7D, according to some embodiments of the invention. FIG. 7E shows that in this virtual network, the NE 770I is coupled to NE 770D and 770F, which are both still coupled to NE 770E.

FIG. 7F illustrates a case where multiple VNEs (VNE 770A.1 and VNE 770H.1) are implemented on different NDs (ND 700A and ND 700H) and are coupled to each other, and where the centralized control plane 776 has abstracted these multiple VNEs such that they appear as a single VNE 770T within one of the virtual networks 792 of FIG. 7D, according to some embodiments of the invention. Thus, the abstraction of a NE or VNE can span multiple NDs.

While some embodiments of the invention implement the centralized control plane 776 as a single entity (e.g., a single instance of software running on a single electronic device), alternative embodiments may spread the functionality across multiple entities for redundancy and/or scalability purposes (e.g., multiple instances of software running on different electronic devices).

Figure 8:
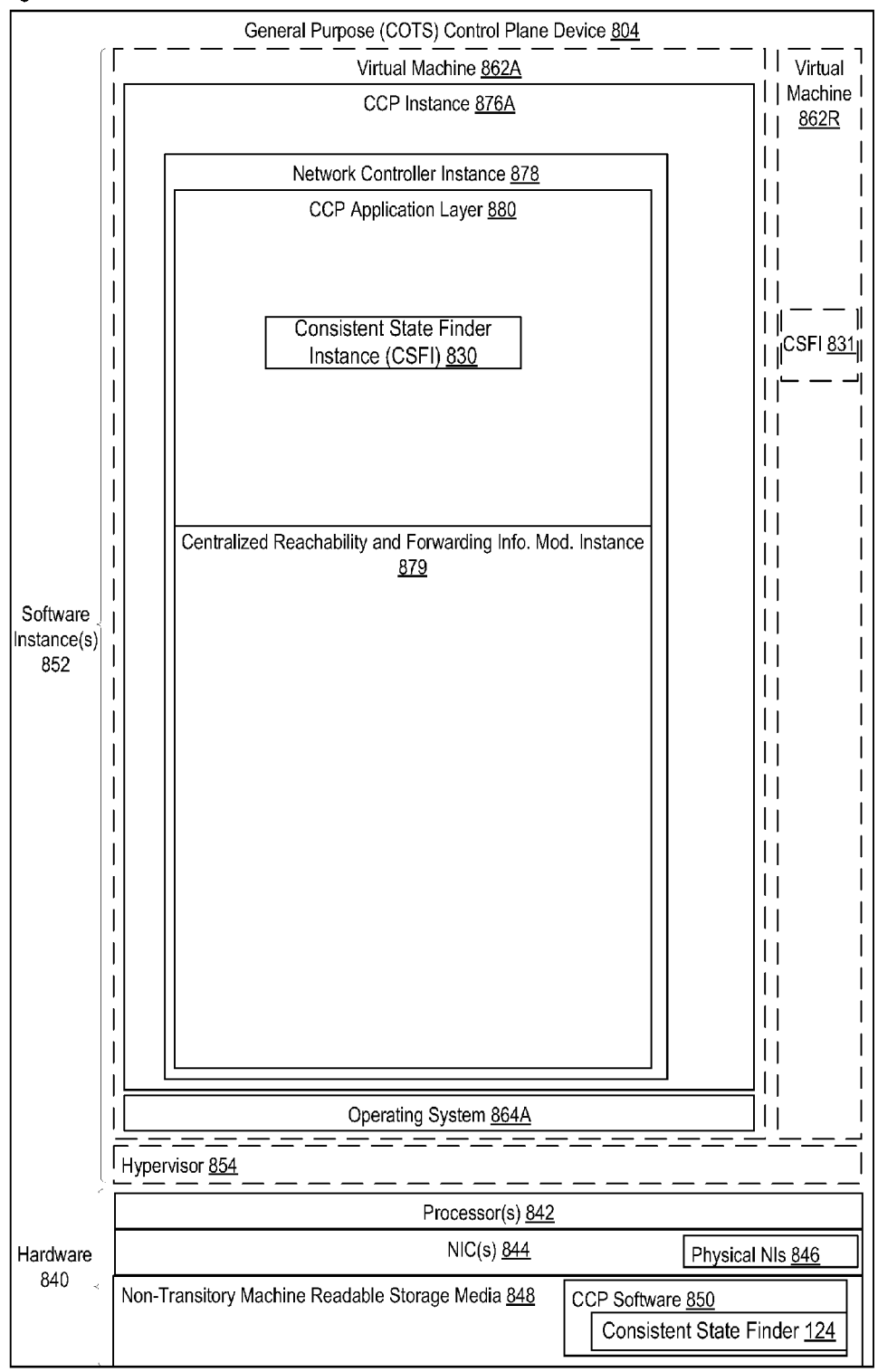
FIG. 8 illustrates a general purpose control plane device 804 including hardware 840 comprising a set of one or more processor(s) 842 (which are often Commercial off-the-shelf (COTS) processors) and network interface controller(s) 844 (NICs; also known as network interface cards) (which include physical NIs 846), as well as non-transitory machine readable storage media 848 having stored therein centralized control plane (CCP) software 850), according to some embodiments of the invention.

Similar to the network device implementations, the electronic device(s) running the centralized control plane 776, and thus the network controller 778 including the centralized reachability and forwarding information module 779, may be implemented a variety of ways (e.g., a special purpose device, a general-purpose (e.g., COTS) device, or hybrid device). These electronic device(s) would similarly include compute resource(s), a set or one or more physical NICs, and a non-transitory machine-readable storage medium having stored thereon the centralized control plane software. For instance, FIG. 8 illustrates, a general purpose control plane device 804 including hardware 840 comprising a set of one or more processor(s) 842 (which are often COTS processors) and network interface controller(s) 844 (NICs; also known as network interface cards) (which include physical NIs 846), as well as non-transitory machine readable storage media 848 having stored therein centralized control plane (CCP) software 850. CCP software 850 contains consistent state finder 124 as illustrated in FIG. 1.

In embodiments that use compute virtualization, the processor(s) 842 typically execute software to instantiate a hypervisor 854 (sometimes referred to as a virtual machine monitor (VMM)) and one or more virtual machines 862A-R that are run by the hypervisor 854; which are collectively referred to as software instance(s) 852. A virtual machine is a software implementation of a physical machine that runs programs as if they were executing on a physical, non-virtualized machine; and applications generally are not aware they are running on a virtual machine as opposed to running on a "bare metal" host electronic device, though some systems provide para-virtualization which allows an operating system or application to be aware of the presence of virtualization for optimization purposes. Again, in embodiments where compute virtualization is used, during operation an instance of the CCP software 850 (illustrated as CCP instance 876A) on top of an operating system 864A are typically executed within the virtual machine 862A. In embodiments where compute virtualization is not used, the CCP instance 876A on top of operating system 864A is executed on the "bare metal" general purpose control plane device 804.

The operating system 864A provides basic processing, input/output (I/O), and networking capabilities. In some embodiments, the CCP instance 876A includes a network controller instance 878. The network controller instance 878 includes a centralized reachability and forwarding information module instance 879 (which is a middleware layer providing the context of the network controller 778 to the operating system 864A and communicating with the various NEs), and an CCP application layer 880 (sometimes referred to as an application layer) over the middleware layer (providing the intelligence required for various network operations such as protocols, network situational awareness, and user-interfaces). At a more abstract level, this CCP application layer 880 within the centralized control plane 776 works with virtual network view(s) (logical view(s) of the network) and the middleware layer provides the conversion from the virtual networks to the physical view. CCP application layer 880 contains consistent state finder instance 830 which is an instance of consistent state finder 124.

The centralized control plane 776 transmits relevant messages to the data plane 780 based on CCP application layer 880 calculations and middleware layer mapping for each flow. A flow may be defined as a set of packets whose headers match a given pattern of bits; in this sense, traditional IP forwarding is also flow-based forwarding where the flows are defined by the destination IP address for example; however, in other implementations, the given pattern of bits used for a flow definition may include more fields (e.g., 10 or more) in the packet headers. Different NDs/NEs/VNEs of the data plane 780 may receive different messages, and thus different forwarding information. The data plane 780 processes these messages and programs the appropriate flow information and corresponding actions in the forwarding tables (sometimes referred to as flow tables) of the appropriate NE/VNEs, and then the NEs/VNEs map incoming packets to flows represented in the forwarding tables and forward packets based on the matches in the forwarding tables.

Standards such as OpenFlow define the protocols used for the messages, as well as a model for processing the packets. The model for processing packets includes header parsing, packet classification, and making forwarding decisions. Header parsing describes how to interpret a packet based upon a well-known set of protocols. Some protocol fields are used to build a match structure (or key) that will be used in packet classification (e.g., a first key field could be a source media access control (MAC) address, and a second key field could be a destination MAC address).

Packet classification involves executing a lookup in memory to classify the packet by determining which entry (also referred to as a forwarding table entry or flow entry) in the forwarding tables best matches the packet based upon the match structure, or key, of the forwarding table entries. It is possible that many flows represented in the forwarding table entries can correspond/match to a packet; in this case the system is typically configured to determine one forwarding table entry from the many according to a defined scheme (e.g., selecting a first forwarding table entry that is matched). Forwarding table entries include both a specific set of match criteria (a set of values or wildcards, or an indication of what portions of a packet should be compared to a particular value/values/wildcards, as defined by the matching capabilities—for specific fields in the packet header, or for some other packet content), and a set of one or more actions for the data plane to take on receiving a matching packet. For example, an action may be to push a header onto the packet, for the packet using a particular port, flood the packet, or simply drop the packet. Thus, a forwarding table entry for IPv4/IPv6 packets with a particular transmission control protocol (TCP) destination port could contain an action specifying that these packets should be dropped.

Making forwarding decisions and performing actions occurs, based upon the forwarding table entry identified during packet classification, by executing the set of actions identified in the matched forwarding table entry on the packet.

However, when an unknown packet (for example, a "missed packet" or a "match-miss" as used in OpenFlow parlance) arrives at the data plane 780, the packet (or a subset of the packet header and content) is typically forwarded to the centralized control plane 776. The centralized control plane 776 will then program forwarding table entries into the data plane 780 to accommodate packets belonging to the flow of the unknown packet. Once a specific forwarding table entry has been programmed into the data plane 780 by the centralized control plane 776, the next packet with matching credentials will match that forwarding table entry and take the set of actions associated with that matched entry.

A network interface (NI) may be physical or virtual; and in the context of IP, an interface address is an IP address assigned to a NI, be it a physical NI or virtual NI. A virtual NI may be associated with a physical NI, with another virtual interface, or stand on its own (e.g., a loopback interface, a point-to-point protocol interface). A NI (physical or virtual) may be numbered (a NI with an IP address) or unnumbered (a NI without an IP address). A loopback interface (and its loopback address) is a specific type of virtual NI (and IP address) of a NE/VNE (physical or virtual) often used for management purposes; where such an IP address is referred to as the nodal loopback address. The IP address(es) assigned to the NI(s) of a ND are referred to as IP addresses of that ND; at a more granular level, the IP address(es) assigned to NI(s) assigned to a NE/VNE implemented on a ND can be referred to as IP addresses of that NE/VNE.

Each VNE (e.g., a virtual router, a virtual bridge (which may act as a virtual switch instance in a Virtual Private LAN Service (VPLS) (RFC 4761 and 4762) is typically independently administrable. For example, in the case of multiple virtual routers, each of the virtual routers may share system resources but is separate from the other virtual routers regarding its management domain, AAA (authentication, authorization, and accounting) name space, IP address, and routing database(s). Multiple VNEs may be employed in an edge ND to provide direct network access and/or different classes of services for subscribers of service and/or content providers.

Within certain NDs, "interfaces" that are independent of physical NIs may be configured as part of the VNEs to provide higher-layer protocol and service information (e.g., Layer 3 addressing). The subscriber records in the AAA server identify, in addition to the other subscriber configuration requirements, to which context (e.g., which of the VNEs/NEs) the corresponding subscribers should be bound within the ND. As used herein, a binding forms an association between a physical entity (e.g., physical NI, channel) or a logical entity (e.g., circuit such as a subscriber circuit or logical circuit (a set of one or more subscriber circuits)) and a context's interface over which network protocols (e.g., routing protocols, bridging protocols) are configured for that context. Subscriber data flows on the physical entity when some higher-layer protocol interface is configured and associated with that physical entity.

The operations of the flow diagrams FIGS. 2, 3 and 6 are described with reference to the exemplary embodiment of FIGS. 1, 7, and 8. However, it should be understood that the operations of flow diagrams can be performed by embodiments of the invention other than those discussed with reference to the exemplary embodiment of FIGS. 1, 7, and 8, and the exemplary embodiment of FIGS. 1, 7, and 8 can perform operations different than those discussed with reference to the flow diagrams of FIGS. 2, 3 and 6.

While the flow diagrams in the figures herein above show a particular order of operations performed by certain embodiments of the invention, it should be understood that such order is exemplary (e.g., alternative embodiments may perform the operations in a different order, combine certain operations, overlap certain operations, etc.).

Different embodiments of the invention may be implemented using different combinations of software, firmware, and/or hardware. Thus, the techniques shown in the figures can be implemented using code and data stored and executed on one or more electronic devices (e.g., an end system, a network device). Such electronic devices store and communicate (internally and/or with other electronic devices over a network) code and data using computer-readable media, such as non-transitory computer-readable storage media (e.g., magnetic disks; optical disks; random access memory; read only memory; flash memory devices; phase-change memory) and transitory computer-readable transmission media (e.g., electrical, optical, acoustical or other form of propagated signals—such as carrier waves, infrared signals, digital signals). In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). Thus, the storage device of a given electronic device typically stores code and/or data for execution on the set of one or more processors of that electronic device.

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method implemented in an electronic device serving as a software-defined networking (SDN) controller in a network containing a plurality of network elements, each network element of the plurality of network elements containing a corresponding forwarding table for forwarding traffic, the method comprising:
   sending messages to the plurality of network elements from the electronic device, wherein each message contains a message identifier, wherein the message identifier indicates an order of the messages, wherein the plurality of network elements utilize at least some of the messages to update corresponding forwarding tables of the plurality of network elements, wherein the plurality of network elements asynchronously capture consistent states of the corresponding forwarding tables of the plurality of network elements, wherein all of the plurality of the network elements capture the consistent states of the corresponding forwarding tables within a predetermined time window, wherein each consistent state includes values, copied within the corresponding forwarding tables of the plurality of network elements, at one moment in time, and wherein each consistent state is associated with one message identifier;
   receiving a set of values from each network element of the plurality of network elements, wherein each value of the set of values is associated with one consistent state for one network element;
   receiving a request to recover the network to a previous state of the network, the request being triggered when a fault is detected in the network, wherein the request is received after the detected fault is contained by the electronic device;
   identifying a consistent state of the corresponding forwarding table for each network element of the plurality of the network elements utilizing message identifiers associated with the consistent states, wherein the identified consistent states represent the previous state of the network without the identified consistent states being captured at a same time at the plurality of network elements; and
   indicating the identified consistent state for each network element of the plurality of the network elements to the network element, wherein the network element updates the corresponding forwarding table to match the identified consistent state if the corresponding forwarding table is inconsistent with the identified consistent state.

2. The method of claim 1, wherein the message identifier is a number.

3. The method of claim 2, wherein the number is a transaction identifier complying with an OpenFlow standard.

4. The method of claim 1, wherein capturing the consistent states of the corresponding forwarding tables comprises:
   at each network element of the plurality of network elements, determining whether activity of the network element is over a predetermined threshold; and
   capturing one consistent state of the network element only when the activity of the network element is below the predetermined threshold.

5. The method of claim 1, wherein each consistent state of the corresponding forwarding table is captured through performing a snapshot of the corresponding forwarding table, wherein the snapshot is a copy of the corresponding forwarding table at a particular moment in time.

6. The method of claim 1, wherein identifying the consistent state for each network element of the plurality of the network elements comprises:
   selecting one consistent state for each network element, wherein each selected consistent state is a most recently captured consistent state for each network element prior to receiving the request to recover the network to the previous state of the network;
   for each message utilized to update the corresponding forwarding tables, identifying inconsistency between consistent states of pairs of the plurality of network elements, wherein the corresponding forwarding tables of both network elements of each pair are updated utilizing the message;
   for each pair where inconsistency is identified, adding one edge to a checkpoint graph pointing to one previous consistent state for one network element in the pair from a current consistent state for the other network element in the pair, wherein the previous consistent state of the network element results in consistency between the consistent states of the pair; and
   for each network element that the checkpoint graph contains an edge pointing to the one consistent state for the network element, updating the one consistent state for the network element using the checkpoint graph.

7. An electronic device serving as a software-defined networking (SDN) controller coupled to a network containing a plurality of network elements, each network element of the plurality of network elements containing a corresponding forwarding table for forwarding traffic, the electronic device comprising:
   a processor and a non-transitory machine-readable storage medium coupled to the processor, the non-transitory machine-readable storage medium containing a consistent state finder executable by the processor, wherein the electronic device is operative to:

send messages to the plurality of network elements from the electronic device, wherein each message is to contain a message identifier, wherein the message identifier is to indicate an order of the messages, wherein the plurality of network elements is to utilize at least some of the messages to update corresponding forwarding tables of the plurality of network elements, wherein the plurality of network elements asynchronously capture consistent states of the corresponding forwarding tables of the plurality of network elements, wherein all of the plurality of the network elements capture the consistent states of the corresponding forwarding tables within a predetermined time window, wherein each consistent state includes values, copied within the corresponding forwarding tables of the plurality of network elements, at one moment in time, and wherein each consistent state is to be associated with one message identifier, receive a set of values from each network element of the plurality of network elements, wherein each value of the set of values is to be associated with one consistent state for one network element, receive a request to recover the network to a previous state of the network based on a fault being detected in the network, wherein the electronic device is operative to receive the request to recover the network to a previous state of the network after the detected fault is contained by the electronic device, identify a consistent state of the corresponding forwarding table for each network element of the plurality of the network elements utilizing message identifiers associated with the consistent states, wherein the identified consistent states are to represent the previous state of the network without the identified consistent states being captured at a same time at the plurality of network elements, and indicate the identified consistent state for each network element of the plurality of the network elements to the network element, wherein the network element is to update the corresponding forwarding table to match the identified consistent state if the corresponding forwarding table is inconsistent with the identified consistent state.

8. The electronic device of claim 7, wherein the message identifier is a number.

9. The electronic device of claim 8, wherein the number is a transaction identifier complying with an OpenFlow standard.

10. The electronic device of claim 7, wherein the capture of the consistent states of the corresponding forwarding table is to:

at each network element of the plurality of network elements, determine whether activity of the network element is over a predetermined threshold; and capture one consistent state of the network element only when the activity of the network element is below the predetermined threshold.

11. The electronic device of claim 7, wherein each consistent state of the corresponding forwarding table is captured through performing a snapshot of the corresponding forwarding table, wherein the snapshot is a copy of the corresponding forwarding table at a particular moment in time.

12. The electronic device of claim 7, wherein the identification of the consistent state for each network element of the plurality of the network elements is to:

select one consistent state for each network element, wherein each selected consistent state is a most recently captured consistent state for each network element prior to receiving the request to recover the network to the previous state of the network;

for each message utilized to update the corresponding forwarding tables, identify inconsistency between consistent states of pairs of the plurality of network elements, wherein corresponding forwarding tables of both network elements of each pair are updated utilizing the message;

for each pair where inconsistency is identified, add one edge to a checkpoint graph pointing to one previous consistent state for one network element in the pair from a current consistent state for the other network element in the pair, wherein the previous consistent state of the network element results in consistency between the consistent states of the pair; and for each network element that the checkpoint graph contains an edge pointing to the one consistent state for the network element, update the one consistent state for the network element using the checkpoint graph.

13. A non-transitory machine-readable medium having instructions stored therein, which when executed by a processor, cause the processor to perform operations at an electronic device serving as a software-defined networking (SDN) controller coupled to a network containing a plurality of network elements, each network element of the plurality of network elements containing a corresponding forwarding table for forwarding traffic, the operations comprising:

sending messages to the plurality of network elements from the electronic device, wherein each message contains a message identifier, wherein the message identifier indicates an order of the messages, wherein the plurality of network elements utilize at least some of the messages to update corresponding forwarding tables of the plurality network elements, wherein the plurality of network elements asynchronously capture consistent states of the corresponding forwarding tables of the plurality of network elements, wherein all of the plurality of the network elements capture the consistent states of the corresponding forwarding tables within a predetermined time window, wherein each consistent state includes values, copied within the corresponding forwarding tables of the plurality of network elements, at one moment in time, and wherein each consistent state is associated with one message identifier;

receiving a set of values from each network element of the plurality of network elements, wherein each value of the set of values is associated with one consistent state for one network element;

receiving a request to recover the network to a previous state of the network based on a fault being detected in the network, wherein the request to recover the network to the previous state of the network is received after the detected fault is contained by the electronic device;

identifying a consistent state of the corresponding forwarding table for each of the plurality of the network elements utilizing message identifiers associated with the consistent states, wherein the identified consistent states represent the previous state of the network without the identified consistent states being captured at a same time at the plurality of network elements; and indicating the identified consistent state for each network element of the plurality of the network elements to the network element, wherein the network element updates the corresponding forwarding table to match the identified consistent state if the corresponding forwarding table is inconsistent with the identified consistent state.

14. The non-transitory machine-readable medium of claim 13, wherein the message identifier is a number.

15. The non-transitory machine-readable medium of claim 14, wherein the number is a transaction identifier complying with an OpenFlow standard.

16. The non-transitory machine-readable medium of claim 13, wherein each consistent state of the corresponding forwarding table is captured through performing a snapshot of the corresponding forwarding table, wherein the snapshot is a copy of the corresponding forwarding table at a particular moment in time.

17. The non-transitory machine-readable medium of claim 13, wherein identifying the consistent state for each network element of the plurality of the network elements comprises:

selecting one consistent state for each network element, wherein each selected consistent state is a most recently captured consistent state for each network element prior to receiving the request to recover the network to the previous state of the network;

for each message utilized to update the corresponding forwarding tables, identifying inconsistency between consistent states of pairs of the plurality of network elements, wherein the corresponding forwarding tables of both network elements of each pair are updated utilizing the message;

for each pair where inconsistency is identified, adding one edge to a checkpoint graph pointing to one previous consistent state for the network element in the pair from a current consistent state for the other network element in the pair, wherein the previous consistent state of the network element results in consistency between the consistent states of the pair; and for each network element that the checkpoint graph contains an edge pointing to the one consistent state for the network element, updating the one consistent state for the network element using the checkpoint graph.

* * * * *